US010176336B2

(12) United States Patent
Navda et al.

(10) Patent No.: US 10,176,336 B2
(45) Date of Patent: Jan. 8, 2019

(54) AUTOMATED DATA TRANSFER FROM MOBILE APPLICATION SILOS TO AUTHORIZED THIRD-PARTY APPLICATIONS

(71) Applicant: Microsoft Technology Licensing, LLC, Redmond, WA (US)

(72) Inventors: Vishnu Navda, Bangalore (IN); Ramachandran Ramjee, Bangalore (IN); Devarayasamudra Chandramouli Vageesh, Bangalore (IN); Saikat Guha, Bangalore (IN); Venkata N. Padmanabhan, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/852,451

(22) Filed: Sep. 11, 2015

(65) Prior Publication Data
US 2017/0032138 A1    Feb. 2, 2017

(30) Foreign Application Priority Data
Jul. 27, 2015   (IN) ............................ 3847/CHE/2015

(51) Int. Cl.
*G06F 21/00* (2013.01)
*G06F 21/62* (2013.01)
(Continued)

(52) U.S. Cl.
CPC ........ *G06F 21/6218* (2013.01); *G06F 3/0481* (2013.01); *G06F 3/04842* (2013.01);
(Continued)

(58) Field of Classification Search
CPC ............... G06F 21/6218; G06F 3/0481; G06F 3/04842; G06F 3/04847; G06F 3/14;
(Continued)

(56) References Cited

U.S. PATENT DOCUMENTS 7,047,498 B2   5/2006 Lui et al.
7,958,458 B2   6/2011 Maeta et al.
(Continued)

FOREIGN PATENT DOCUMENTS

WO    2014141300 A2    9/2014

OTHER PUBLICATIONS

"International Search Report and Written Opinion Issued in PCT Application No. PCT/US2016/042376", dated Sep. 30, 2016, 15 Pages.
(Continued)

*Primary Examiner* — Joseph P Hirl
*Assistant Examiner* — Chi Nguy
(74) *Attorney, Agent, or Firm* — Alleman Hall Creasman & Tuttle LLP

(57) ABSTRACT

A "Data Transfer Tool" extracts, labels and stores user data or information that may be confined within application silos during user interaction with arbitrary apps. The Data Transfer Tool enables sharing of this otherwise siloed data shared across and between authorized apps. The Data Transfer Tool provides a task-centric approach to define and extract structured and semantically meaningful information from source applications by providing multiple semantic models that are individually tailored to particular source apps. The Data Transfer Tool applies an accessibility API or the like of the OS in combination with the semantic model for the source app to scrape user entered or selected data or information from the source app. The Data Transfer Tool enables and creates new user experiences and increases user efficiency (Continued)

when interacting with various apps by making the scraped data or information available to subscribing destination apps approved to receive that data or information.

17 Claims, 6 Drawing Sheets

(51) Int. Cl.
| | |
|---|---|
| *G06F 3/0481* | (2013.01) |
| *G06F 3/0484* | (2013.01) |
| *G06F 3/14* | (2006.01) |
| *G06F 3/16* | (2006.01) |
| *G06F 17/27* | (2006.01) |
| *G06F 9/54* | (2006.01) |
| *G06F 9/46* | (2006.01) |
| *G06F 17/24* | (2006.01) |

(52) U.S. Cl.
CPC ............ *G06F 3/04847* (2013.01); *G06F 3/14* (2013.01); *G06F 3/167* (2013.01); *G06F 9/46* (2013.01); *G06F 9/541* (2013.01); *G06F 17/243* (2013.01); *G06F 17/27* (2013.01)

(58) Field of Classification Search
CPC .......... G06F 3/167; G06F 17/27; G06F 21/62; G06F 3/048847; G06F 9/541
See application file for complete search history.

(56) References Cited

U.S. PATENT DOCUMENTS

| | | | |
|---|---|---|---|
| 8,434,157 | B1 | 4/2013 | Wang et al. |
| 8,832,847 | B2 | 9/2014 | Anand et al. |
| 8,839,266 | B1 | 9/2014 | Partridge et al. |
| 9,075,508 | B1 | 7/2015 | Cronin |
| 2010/0050101 | A1 | 2/2010 | Baik et al. |
| 2010/0174560 | A1 | 7/2010 | Quan et al. |
| 2011/0270794 | A1* | 11/2011 | Drory ............... G06Q 10/10 706/52 |
| 2011/0283230 | A1 | 11/2011 | Gnanasambandam et al. |
| 2012/0016678 | A1 | 1/2012 | Gruber et al. |
| 2013/0024873 | A1* | 1/2013 | Hillier ................ G06F 9/54 719/313 |
| 2013/0298247 | A1 | 11/2013 | Laurila et al. |
| 2013/0332442 | A1 | 12/2013 | Liu et al. |
| 2014/0018048 | A1* | 1/2014 | Anand ............... H04W 4/003 455/414.1 |
| 2014/0122989 | A1* | 5/2014 | Eigner ............... H04L 67/30 715/226 |
| 2014/0164476 | A1 | 6/2014 | Thomson |
| 2014/0172986 | A1 | 6/2014 | Kumar et al. |

OTHER PUBLICATIONS

Chin, et al., "Analyzing Inter-Application Communication in Android", In Proceedings of the 9th international conference on Mobile systems, applications, and services, Jun. 28, 2011, 14 pages.
Accessibility for Windows Runtime apps using C#/VB/C++ and XAML, Retrieved on: Jun. 9, 2015 Available at: https://msdn.microsoft.com/en-us/library/windows/apps/hh452680.aspx.
"Use AutoFill and Flash Fill", Retrieved on: Jun. 9, 2015 Available at: http://office.microsoft.com/en-in/excelhelp/use-autofill-and-flash-fill-RZ103988276.aspx.
"Flurry Analytics", Retrieved on: Jun. 9, 2015 Available at: http://www.flurry.com/solutions/analytics.
"Google Analytics", Retrieved on: Jun. 9, 2015 Available at: http://www.google.com/analytics/mobile.

"Google Now", Retrieved on: Jun. 9, 2015 Available at: http://www.google.com/landing/now/.
"Put the Internet to work for you", Retrieved on: Jun. 9, 2015 Available at: https://ifttt.com/.
"Meet Cortana", Retrieved on: Jun. 9, 2015 Available at: http://www.windowsphone.com/en-in/how-to/wp8/cortana/meet-cortana.
"Schema.org", Retrieved on: Jun. 9, 2015 Available at: https://schema.org/.
Chen, et al., "Peeking into Your App without Actually Seeing it: UI State Inference and Novel Android Attacks", In Proceedings of the 23rd USENIX Security Symposium, Aug. 2014, 16 pages.
Enck, et al., "TaintDroid: An Information-Flow Tracking System for Realtime Privacy Monitoring on Smartphones", In Proceedings of the 9th USENIX conference on Operating systems design and implementation, Oct. 4, 2010, 15 pages.
Hao, et al., "PUMA: Programmable UI-Automation for Large-Scale Dynamic Analysis of Mobile Apps", In Proceedings of the 12th annual international conference on Mobile systems, applications, and services, Jun. 2, 2014, pp. 204-217.
Liu, et al., "DECAF: Detecting and Characterizing Ad Fraud in Mobile Apps", In Proceedings of the 11th USENIX Conference on Networked Systems Design and Implementation, Apr. 2, 2014, 16 pages.
Nath, et al., "SmartAds: Bringing Contextual Ads to Mobile Apps", In Proceeding of the 11th annual international conference on Mobile systems, applications, and services, Jun. 25, 2013, pp. 111-123.
Ravindranath, et al., "Automatic and Scalable Fault Detection for Mobile Applications", In Proceedings of the 12th annual international conference on Mobile systems, applications, and services, Jun. 16, 2014, pp. 190-203.
Ravindranath, et al., "Timecard: Controlling User-Perceived Delays in Server-Based Mobile Applications", In Proceedings of the Twenty-Fourth ACM Symposium on Operating Systems Principles, Nov. 3, 2013, pp. 85-100.
Ravindranath, et al., "AppInsight: Mobile App Performance Monitoring in the Wild", In Proceedings of the 10th USENIX conference on Operating Systems Design and Implementation, Oct. 8, 2012, pp. 107-120.
Tongaonkar, et al., "Understanding Mobile App Usage Patterns Using In-App Advertisements", In Proceedings of the 14th international conference on Passive and Active Measurement, Mar. 18, 2013, pp. 63-72.
Xu, et al., "Automatic Generation of Mobile App Signatures from Traffic Observations", In Proceedings of IEEE Infocom, Apr. 26, 2015, 9 pages.
Chandra, et al., "How to Smash the Next Billion Mobile App Bugs?", In Journal Mobile Computing and Communications, vol. 19 Issue 1, Jan. 2015, pp. 34-38.
Chandra, et al., "Towards Scalable Automated Mobile App Testing", In Technical Report, Jan. 2014, 6 pages.
Ravindranath, et al., "Give in to Procrastination and Stop Prefetching", In Proceedings of the Twelfth ACM Workshop on Hot Topics in Networks, Nov. 21, 2013, 7 pages.
Ravindranath, et al., "Automatic and Scalable Fault Detection for Mobile Applications", In Technical Report, Sep. 2013, 14 pages.
Agarwal, et al., "There's an app for that, but it doesn't work. Diagnosing Mobile Applications in the Wild", In Proceedings of Ninth ACM Workshop on Hot Topics in Networks, Oct. 20, 2010, 6 pages.
"Second Written Opinion Issued in PCT Application No. PCT/US2016/042378", dated Jul. 4, 2017, 9 Pages.
"International Preliminary Report on Patentability Issued in PCT Application No. PCT/US2016/042376", dated Nov. 9, 2017, 10 pages.
Bohn, D., "Now on Tap is the coolest Android feature in a long time", The Verge website, https://www.theverge.com/2015/5/28/8681875/now-on-tap-is-the-coolest-android-feature-google-io, May 28, 2015, 3 pages.

* cited by examiner

AUTOMATED DATA TRANSFER FROM MOBILE APPLICATION SILOS TO AUTHORIZED THIRD-PARTY APPLICATIONS

CROSS-REFERENCE TO RELATED APPLICATIONS

This application claims priority to a foreign application under 35 U.S.C. 119(b) and 37 CFR 1.55(d), of a previously filed India Provisional Patent Application, Application No. 3847/CHE/2015, filed on Jul. 27, 2015, by Vishnu Navda, et al., and entitled "AUTOMATED DATA TRANSFER FROM MOBILE APPLICATION SILOS TO AUTHORIZED THIRD-PARTY APPLICATIONS".

BACKGROUND

Applications that make use of user data entry or selection typically silo the user-entered data. This includes data generated both explicitly, such as the user actually booking a flight through an app, as well as implicitly, such as browsing reviews of restaurants through a review app. Consequently, user entered data is not generally available to other unrelated applications.

SUMMARY

The following Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Further, while certain disadvantages of other technologies may be noted or discussed herein, the claimed subject matter is not intended to be limited to implementations that may solve or address any or all of the disadvantages of those other technologies. The sole purpose of this Summary is to present some concepts of the claimed subject matter in a simplified form as a prelude to the more detailed description that is presented below.

In general, a "Data Transfer Tool," as described herein, provides various techniques for extracting, labeling and storing user data that is otherwise confined within application silos during user data entry. Consequently, the Data Transfer Tool enables otherwise siloed data to be shared across and between a plurality of authorized applications (also referred to as "apps") for the benefit of the user. In various implementations, the Data Transfer Tool applies an accessibility application programming interface (API), or an assist API or the like to extract structured user data from a presentation layer of the operating system (OS) in response to user interaction with arbitrary source applications, without any modifications to the arbitrary source application code or binary. In other words, the Data Transfer Tool applies any API that may be used to obtain data directly from the presentation layer, regardless of the intended purpose of the API. The Data Transfer Tool then provides various mechanisms for sharing the extracted data to be shared with other authorized destination applications.

In various implementations, the extracted data is formatted as an app-independent task. In general, a task represents a particular activity and associated attributes or properties. So, a task can be considered as a template with variables (attributes or properties) that are filled to complete the task template. For example, a flight-booking task can include attributes such as date, departure city, destination city, airline, etc.

More specifically, in various implementations, the Data Transfer Tool provides a task-centric approach to define and extract structured and semantically meaningful information from source applications as users interact with those applications. In various implementations, the Data Transfer Tool provides a plurality of semantic models that are each individually tailored to a particular source application. Then, when a user interacts with a particular source application, the Data Transfer Tool applies an accessibility API, or an assist API or the like in combination with the semantic model for the particular source application to scrape or otherwise extract user entered or selected data or information from the presentation layer of the OS. The Data Transfer Tool then enables and creates new user experiences and increases user efficiency when interacting with destination applications by making the scraped data or information available to one or more subscribing destination applications that are approved to receive that data or information.

For example, in various implementations, the Data Transfer Tool applies an API such as an accessibility API, or assist API or the like to extract a plurality of data items from text being rendered on a display device by a presentation subsystem or layer of the OS in response to user interaction with a particular source application. The Data Transfer Tool then applies a predefined application content model corresponding to that source application to identify and label the extracted data items. In addition, in various implementations, a subscription process or the like is applied to authorize (e.g., set an authorization state) and subscribe one or more third-party applications to access the identified and labeled extracted data items. Finally, in various implementations, the Data Transfer Tool automatically applies one or more of the identified and labeled extracted data items to populate one or more data fields of one or more of the authorized third-party destination applications.

The Data Transfer Tool described herein provides various techniques for extracting, labeling and storing user data siloed by a source application so that the stored data can be shared across and between a plurality of authorized destination applications to improve user interaction efficiency with the authorized applications. In addition to the benefits described above, other advantages of the Data Transfer Tool will become apparent from the detailed description that follows hereinafter.

BRIEF DESCRIPTION OF THE DRAWINGS

The specific features, aspects, and advantages of the claimed subject matter will become better understood with regard to the following description, appended claims, and accompanying drawings where:

DETAILED DESCRIPTION

Figure 1:
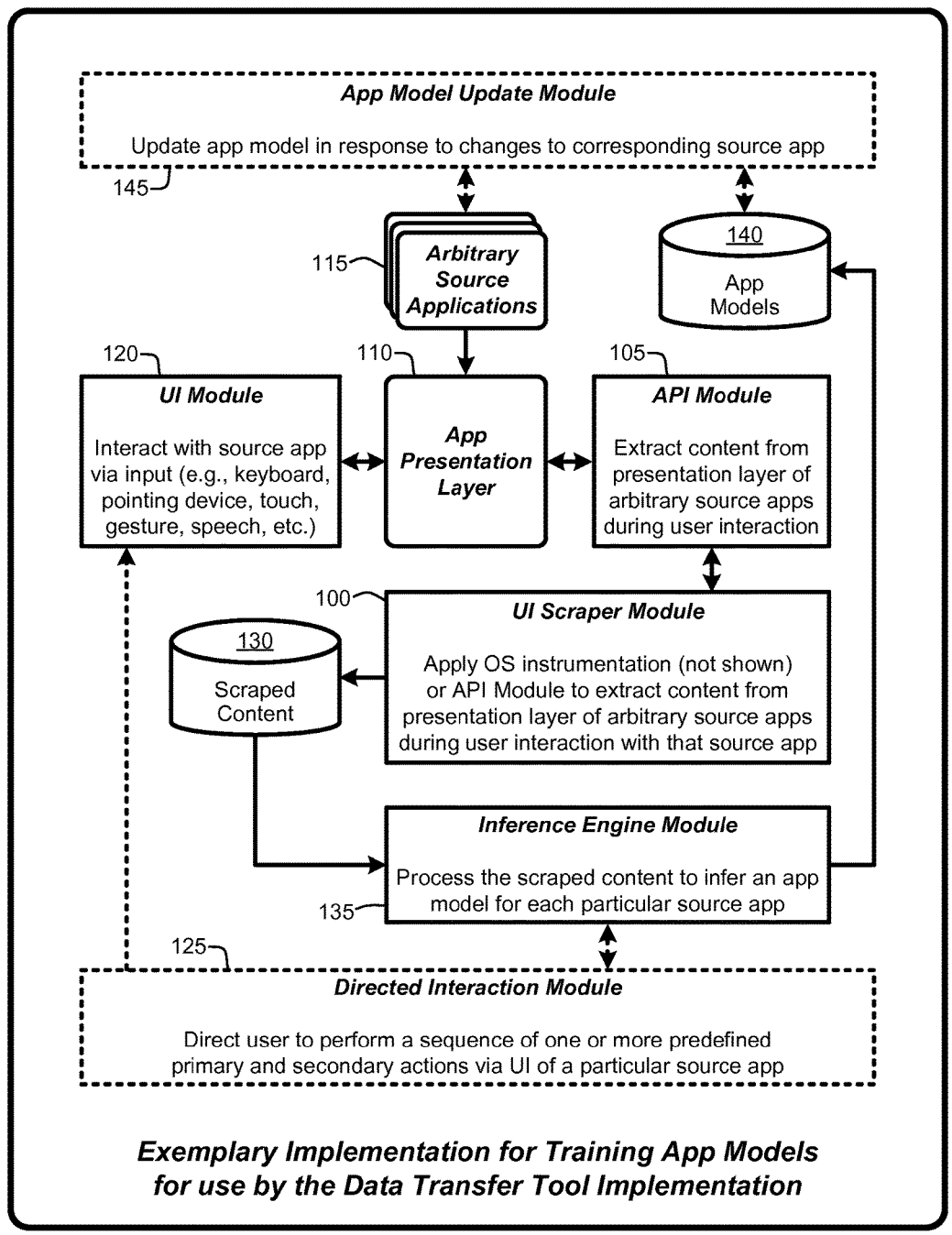
FIG. 1 provides an exemplary architectural flow diagram that illustrates program modules for effecting various implementations for training app models for use by a "Data Transfer Tool," as described herein.

In the following description of various implementations of a "Data Transfer Tool," reference is made to the accompanying drawings, which form a part hereof, and in which is shown by way of illustration specific implementations in which the Data Transfer Tool may be practiced. It should be understood that other implementations may be utilized and structural changes may be made without departing from the scope thereof.

Specific terminology will be resorted to in describing the various implementations described herein, and that it is not intended for these implementations to be limited to the specific terms so chosen. Furthermore, each specific term includes all its technical equivalents that operate in a broadly similar manner to achieve a similar purpose. Reference herein to "one implementation," or "another implementation," or an "exemplary implementation," or an "alternate implementation" or similar phrases, means that a particular feature, a particular structure, or particular characteristics described in connection with the implementation can be included in at least one implementation of the Data Transfer Tool. Further, the appearance of such phrases throughout the specification are not necessarily all referring to the same implementation, and separate or alternative implementations are not mutually exclusive of other implementations. The order described or illustrated herein for any process flows representing one or more implementations of the Data Transfer Tool does not inherently indicate any requirement for the processes to be implemented in the order described or illustrated, and any such order described or illustrated herein for any process flows do not imply any limitations of the Data Transfer Tool.

As utilized herein, the terms "component," "system," "client" and the like are intended to refer to a computer-related entity, either hardware, software (e.g., in execution), firmware, or a combination thereof. For example, a component can be a process running on a processor, an object, an executable, a program, a function, a library, a subroutine, a computer, or a combination of software and hardware. By way of illustration, both an application running on a server and the server can be a component. One or more components can reside within a process and a component can be localized on one computer and/or distributed between two or more computers. The term "processor" is generally understood to refer to a hardware component, such as a processing unit of a computer system.

Furthermore, to the extent that the terms "includes," "including," "has," "contains," variants thereof, and other similar words are used in either this detailed description or the claims, these terms are intended to be inclusive in a manner similar to the term "comprising" as an open transition word without precluding any additional or other elements.

1.0 Introduction:

Applications (also referred to herein as "apps") are used to perform a wide variety of operations, e.g., communicate with other users, populate a user calendar, search for online content, call a cab, order a pizza, book a hotel room, purchase items, download or stream music, movies or other content, read or enter reviews, etc. Such operations inherently make use of structured information, including, but not limited to, message content, user name, pick-up and drop-off locations, current address, arrival date and time, search terms, item selection, etc. User data entry and/or selections when performing such operations are typically siloed or otherwise held private by the app used to perform those operations.

In general, a "Data Transfer Tool," as described herein, provides various techniques for extracting, labeling and storing user data resulting from interaction with arbitrary apps during user data entry or selection. The Data Transfer Tool automatically formats this information as an app-independent "task" that is no longer dependent on the app from which it was extracted. The Data Transfer Tool then enables the tasks representing this otherwise siloed or private data to be shared across and between authorized apps. Apps from which data is extracted are referred to herein as "source apps." Conversely, apps subscribing to or otherwise consuming or using the data extracted from source apps are referred to herein as "destination apps." In various implementations, any particular app may act as either or both a source application and a destination application. As such, any particular app may be both the source of user entered or selected data or information, and a consumer of user entered or selected data or information extracted from other apps.

Authorized destination apps may or may not have any relation or interaction capabilities with the arbitrary source app from which the task was extracted. Consequently, the Data Transfer Tool enables data sharing between source and destination apps that may be unrelated and otherwise incompatible, thereby enhancing and improving interactivity between arbitrary apps while increasing user efficiency when interacting with those apps. Further, various data sharing features of the Data Transfer Tool enable and create a wide range of new user experiences while improving and increasing user efficiency when interacting with apps by sharing data or information with subscribing destination apps that are approved to receive that data or information from one or more source apps.

In various implementations, the Data Transfer Tool provides a user interface (UI) or the like to specify whether any particular app is allowed to act as a source app. In other words, the user may choose to either allow or prevent particular apps from acting as a source of data to any other apps. Further, in various implementations, subscriptions to tasks by one or more destination apps may be authorized (or cancelled) via the user interface on either a global basis (e.g., allowed to access all tasks, or a particular specified subset of tasks, from all source apps), or on a per-source basis (e.g., allowed to access all tasks, or a specified subset of tasks, from one or more specified source apps). In other words, the user is provided with a UI or the like to set authorization states (e.g., authorized or denied) in response to task subscription requests.

In various implementations, the Data Transfer Tool includes an indication of the original source app from which the task was extracted. Additional metadata relating to the task creation, such as date, time, user location, etc., may optionally be included with the task for consumption by authorized destination apps. In various implementations, the UI of the Data Transfer Tool may be applied to separately authorize (or deny) particular destination apps to consume metadata associated with otherwise authorized tasks.

In various implementations, data extraction is accomplished by applying an accessibility application programming interface (API), or an assist API or the like to a presentation layer of the operating system (OS) or source app to extract textual information from content being rendered or otherwise presented by the source app. In other words, the Data Transfer Tool applies any API that may be used to obtain data directly from the presentation layer, regardless of the intended purpose of the API. In particular, API's such as accessibility or assist API's and the like are adapted and applied to extract or scrape user entered or selected data or information from content and/or controls (e.g., radio buttons, check boxes, drop-down lists, etc.) being rendered on a display by an arbitrary source app as the user interacts with that app. For purposes of discussion, the user entered or selected data or information extracted from the app may be referred to herein as "extracted content" or similar terms.

Once the API has been applied to obtain extracted content, the Data Transfer Tool then applies a corresponding app model to the extracted content to automatically label and format the extracted content as structured information represented by app-independent tasks. In general, each app model specifies a list of UI elements of the source app that are to be tracked and logged. User input values or selections (e.g., attributes) for these UI elements are extracted from the logs, and then formatted as tasks that are stored or otherwise logged and published to authorized subscribing apps.

Since tasks are independent of the app from which they were generated, using two different source apps to perform the same operations, e.g., booking identical flights for the same user, may result in two identical tasks (which may have different metadata) regardless of how the underlying information was originally selected or presented by either source app. In this sense, a task is defined herein as an action (e.g., booked flight, viewed or entered review, placed item in digital shopping cart, etc.) in combination with one or more action-specific attributes (e.g., origin, destination, time, review content, item identification, etc.).

For example, in various implementations, when the user books a flight in any flight app (or performs any data selection or entry in any other source app), the Data Transfer Tool may generate a task that includes attributes of arrival time and arrival airport relating to the flight booking action. In various implementations, the user may be notified of the option to share the resulting flight booking task (or task relating to some other data entry or selection) with one or more destination apps that have subscribed to or requested this task. For example, an authorized cab app may subscribe to the flight-booking task (without caring where or how that task originates). This would allow the user to easily book a cab using the authorized cab app for a time shortly after her flight is scheduled to arrive without needing to reenter information such as name, arrival airport, arrival time, etc.

Further, in various implementations, the user may be notified when a task from a source app is being provided to a destination app, unless prior authorization has been granted, in which case the corresponding task may be provided to the authorized destination app without notification to the user. If the subscribing destination app (e.g., the aforementioned cab app) is authorized to share the user's flight booking data (or other task), the Data Transfer Tool automatically passes the requested task to the authorized app for use by the authorized app to automatically begin or complete some operation (e.g., call a cab) or to populate some data field or make a selection in a UI widget. Consequently, the data transfer features of the Data Transfer Tool improve user efficiency by eliminating some or all of the manual data entry that would otherwise be requested by the authorized app.

1.1 System Overview:

As noted above, the "Data Transfer Tool," provides various techniques for extracting, labeling and storing user data siloed by a source application so that the stored data can be shared across and between a plurality of authorized destination applications. The processes summarized above are illustrated by the general system diagrams of FIG. 1 and FIG. 2. In particular, the system diagram of FIG. 1 illustrates the interrelationships between program modules for implementing various implementations of the Data Transfer Tool for training app models, as described herein. In addition, the system diagram of FIG. 2 illustrates the interrelationships between program modules for implementing various implementations of the Data Transfer Tool for sharing data with authorized third-party applications, as described herein.

Figure 2:
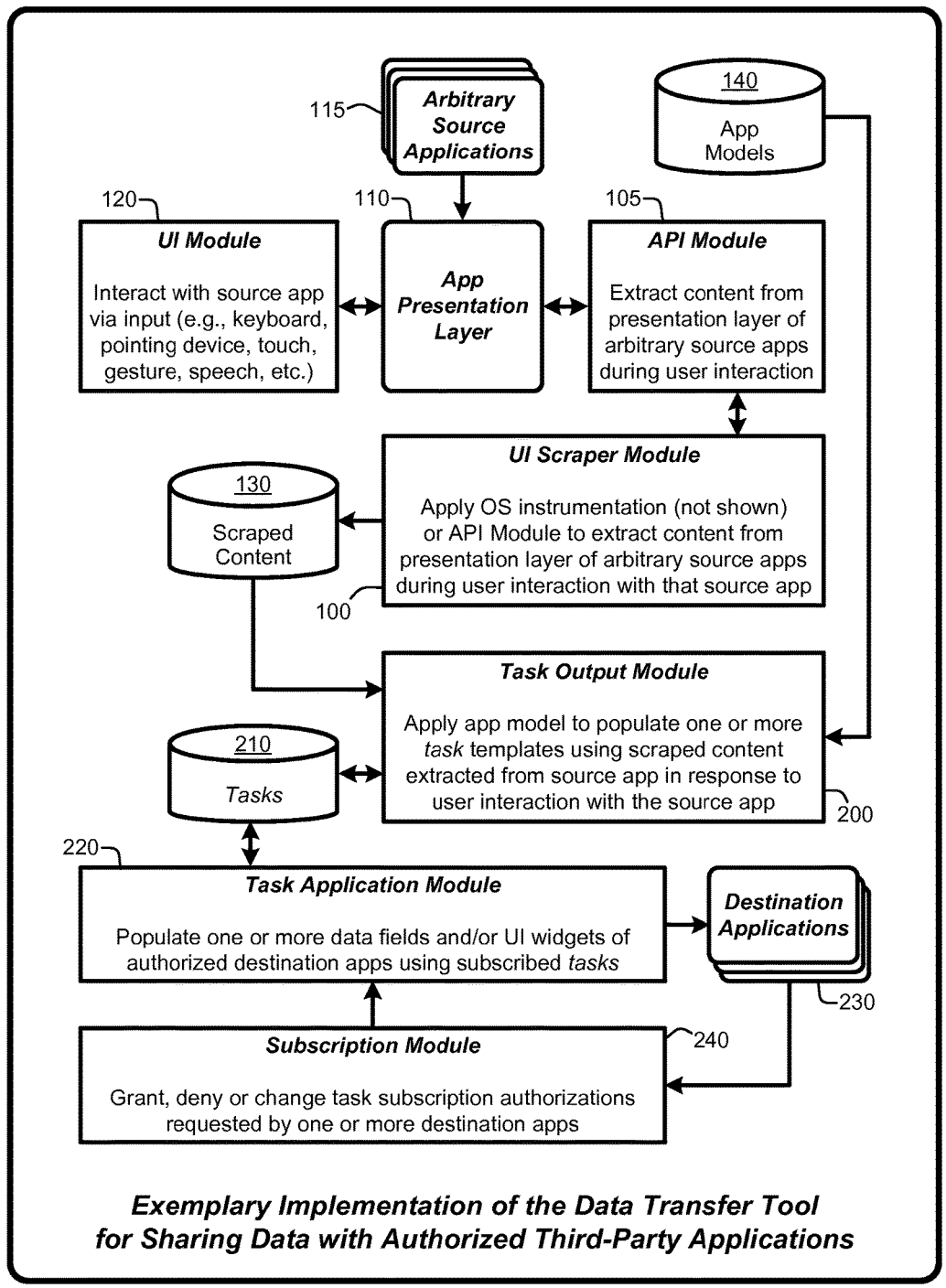
FIG. 2 provides an exemplary architectural flow diagram that illustrates program modules for effecting various implementations of the Data Transfer Tool for sharing data with authorized third-party applications, as described herein.

Furthermore, while the system diagram of FIG. 1 and FIG. 2 illustrate high-level views of various implementations of the Data Transfer Tool, these figures are not intended to provide an exhaustive or complete illustration of every possible implementation of the Data Transfer Tool as described throughout this document.

In addition, any boxes and interconnections between boxes that may be represented by broken or dashed lines in either or both FIG. 1 and FIG. 2 represent alternate implementations of the Data Transfer Tool described herein, and any or all of these alternate implementations, as described below, may be used in combination with other alternate implementations that are described throughout this document.

In general, as illustrated by FIG. 1, in various implementations, the app model training processes enabled by the Data Transfer Tool begins operation with a UI Scraper Module 100 that applies OS instrumentation (not shown) or an API Module 105 (e.g., an Accessibility API, an "Assist" API, etc.) to extract content from an app presentation layer 110 of arbitrary source apps 115 during user interaction with that source app. The extracted content (e.g., scraped content 130) is then logged or stored to a database, library or other storage for subsequent use by the Data Transfer Tool.

Both the OS instrumentation or API Module 105 generally operate by extracting content from the app presentation layer 110 of the arbitrary source apps 115 during user interaction with those arbitrary source apps. In general, a UI Module 120 provides a user interface that enables the user to interact with source apps 115 via typical input methods, including, but not limited to, keyboards, pointing devices, touch, gestures, speech, etc.).

In various implementations, during the app model training process, an optional Directed Interaction Module 125 directs one or more users to perform a sequence of one or more predefined primary and secondary actions via the UI of particular source apps 115. The scraped content 130 is captured during this directed user interaction to provide a baseline that enables the Data Transfer Tool to infer a mapping between user actions and UI widgets to particular user entered data or selections. See Section 2.3.1 for a discussion of app model construction via guided human interaction.

In various implementations, an Inference Engine Module 135 is then applied by the Data Transfer Tool to process the scraped content 130 to infer an app model 140 for each particular source app 115. In various implementations, an App Model Update Module 145 is applied by the Data Transfer Tool to automatically update one or more of the app models 140 in response to changes or updates to the corresponding source app 115.

As illustrated by FIG. 2, once one or more app models 140 have been inferred or otherwise constructed by the Data Transfer Tool, the Data Transfer is capable of sharing data scraped or otherwise extracted from arbitrary source apps with one or more authorized destination apps. For example, as illustrated in FIG. 2, the UI Scraper Module 100 again applies OS instrumentation (not shown) or the API Module 105 to extract content from an app presentation layer 110 of arbitrary source apps 115 during user interaction with that source app via the UI module 120. The resulting scraped content 130 is again logged or stored to a database, library or other storage for subsequent use by the Data Transfer Tool.

However, in contrast to the use of the scrapped content 130 shown in FIG. 1, because the app models 140 have already been created, the processes illustrated by FIG. 2 continues with a Task Output Module 200 that matches app models 140 to the arbitrary source applications from which particular elements of the scraped content 130 were generated, and then applies the appropriate app model to populate one or more task templates using the scraped content extracted from the source app in response to user interaction with the source app. The populated task templates are then stored to a library or database of tasks 210.

A Task Application Module 220 then automatically populates one or more data fields and/or UI widgets of authorized destination apps 230 based on subscriptions to those tasks by one or more authorized destination apps. Authorizations for these subscriptions are maintained by a Subscription Module 240. In general, the subscription module 240 provides a user interface that enables the user to grant, deny or change task subscription authorizations requested by one or more destination apps.

2.0 Operational Details of the Data Transfer Tool:

The above-described program modules are employed for implementing various implementations of the Data Transfer Tool. As summarized above, the Data Transfer Tool provides various techniques for extracting, labeling and storing user data siloed or otherwise held private by a source application so that the stored data can be shared across and between a plurality of authorized destination applications. The following sections provide a detailed discussion of the operation of various implementations of the Data Transfer Tool, and of exemplary methods for implementing the program modules described in Section 1 with respect to FIG. 1. In particular, the following sections provides examples and operational details of various implementations of the Data Transfer Tool, including:

Operational Overview of the Data Transfer Tool;
Information Extraction from Arbitrary Source Apps;
App-Specific Semantic Models of Source Apps;
Exemplary Cross-App Data Sharing Apps; and
Additional Implementations of the Data Transfer Tool.

2.1 Operational Overview:

Much of what is of interest to users and about users is contained within the apps operated by users. For example, while performing a search, a mobile user might be as interested in finding a relevant app page (e.g., a comment they had read earlier on some web page) as in searching through their emails. As another example, an app session that results in an incomplete transaction (e.g., a search for a flight that stops short of an actual purchase) might not generate a confirmation email or other external indication but could still yield a useful signal or task relating to the user's intent. Such signals can be used directly for the user's benefit by a variety of third-party apps, personal digital assistants, or other processes and applications. Unfortunately, many apps are largely black boxes that expose little or no information for use by either the OS under which those apps are executed or for use by other third-party apps. As a result, valuable user information remains locked up in individual app silos or are otherwise held private or simply deleted by the apps in which that user information is generated, input, or otherwise selected.

Advantageously, various processes enabled by the Data Transfer Tool provide a platform that enables users to take control of in-app data of source apps and share it effortlessly with one or more authorized destination apps. These processes also enable independent app developers to innovate on top of the availability of formatted user data by enabling their apps to receive information via subscription to app-independent tasks.

As discussed herein, the Data Transfer Tool provides a data abstraction based on the concept of tasks (e.g., actions and one or more associated attributes). Tasks provide semantically meaningful information from raw textual content extracted from arbitrary source apps for authorized use by the OS or other destination apps. More specifically, the Data Transfer Tool operates by applying the accessibility API, or assist API or the like, to tap the interface between apps and the presentation subsystem on computing devices. Raw text (and various control information) being displayed by the source app is captured via the accessibility API, or assist API or the like, along with optional on-screen position information of the corresponding UI widget. This extracted information is then annotated with semantic labels via task templates in the app model.

In various implementations, the app models may be generated through a learning process that models the extracted raw text using training data that is generated either explicitly (e.g., from directed actions performed by human users interacting with the source app) or implicitly (e.g., from structured confirmation emails generated in response to completed transactions performed by users). The app models are then applied during runtime of the source app to convert the raw text extracted by the accessibility API, or assist API or the like, into a structured and semantically meaningful information stream comprising app-independent tasks. These tasks are then made available to other authorized apps either in real-time or from a local or remote task store or database.

To assist third-party app developers to construct destination apps with subscription capabilities for accessing and consuming tasks, in various implementations, the Data Transfer Tool provides a predefined "wrapper library" or subscription API (also referred to herein as a "subscription module") that can be called by the destination app to subscribe to specific predefined tasks or task categories. In general, this wrapper library or subscription API acts as an intermediary to provide authorized destination apps with requested tasks that have been extracted and stored to a local or remote task database or the like by the Data Transfer Tool. Whenever a destination app receives a subscribed task, the information (e.g., attributes) of that task is used to populate or select one or more corresponding fields or controls of the destination app.

In various implementations, destination apps interested in subscribing to specific tasks register with the Data Transfer Tool to request task subscription authorizations. In various implementations, during app setup or installation or when an app is launched for the first time (or optionally each time that an app is launched), the Data Transfer Tool may notify the user of the tasks or task categories that the app wishes to subscribe to. The user can then either allow or deny the requested permissions or authorizations for the requested subscriptions, either globally, or on a per-app basis.

Following user authorization to the subscription requests, the Data Transfer Tool monitors tasks extracted from source apps. Then, whenever a task for which a subscription exists becomes available, the corresponding destination apps may be notified of the availability of the subscribed task. For example, in various implementations, destination apps are automatically invoked, initiated, or otherwise executed by the Data Transfer Tool whenever a subscribed task becomes available. In other implementations, destination apps are automatically notified of the availability of subscribed tasks by the Data Transfer Tool whenever those apps are executed or otherwise invoked. In various implementations, authorized destination apps already executing may receive an automated notification from the Data Transfer Tool whenever a subscribed task or a task in a subscribed category becomes available from any source app. Similarly, in various implementations, authorized destination apps may actively query the Data Transfer Tool to determine whether a particular task (or task category) is available from any source app for use by the authorized destination app.

To ensure that the user is in full control of his data, various implementations of the Data Transfer Tool provide both access transparency and access control, thereby improving user security. For example, in various implementations, at any point in time, access transparency is enabled via a UI that presents the user with a list or other identifying information that defines or specifies which destination apps are subscribing to particular tasks or task categories. Similarly, access control is enabled in various implementations via a UI that presents the user with various mechanisms to update or change the subscription authorizations or permissions of particular destination apps to either allow or disallow access to particular tasks or task categories by those apps.

2.2 Information Extraction from Arbitrary Source Apps:

In order to extract in-app data, the Data Transfer tool taps into both user input (e.g., keyboard, touch, speech, gesture, pen, etc.) and the display output of the OS and/or arbitrary applications.

For example, in various implementations the Data Transfer Tool applies a lightweight OS instrumentation layer that taps into the presentation layer (e.g., the UI) of the app in order to obtain a rich view of the user's activities inside arbitrary apps. However, rather than instrumenting OS to tap user interaction with the UI of arbitrary apps, in other implementations, the Data Transfer Tool applies an accessibility API, or assist API or the like, (available in most modern OSes) that enables features such as font and control size and color changes, audio narration of on-screen content, etc. The Data Transfer Tool leverages these types of APIs to tap on-screen content from unmodified third-party source apps. In various implementations, the Data Transfer Tool includes a UI scraper module (see Section 2.2.1, below) that runs as a background service that applies the accessibility API, or assist API or the like, to scrape or extract content from any or all foreground apps.

In general, accessibility APIs, assist APIs, and the like are applications, often provided as inherent OS accessibility functionality, that provides various mechanisms to improve user interaction with arbitrary apps for users who may have visual, physical or age-related limitations that prevent them from fully seeing, hearing, or otherwise interacting with information being rendered by an application. As such, these types of APIs have direct access to content being rendered on a display in order to capture and reformat or re-present that content in a way that may be more useful to particular users. For example, many existing accessibility APIs, assist APIs, and the like, recolor and/or resize text and/or controls or generate digital speech from text and/or controls (e.g., radio buttons, check boxes, drop-down lists, etc.) being rendered on a display by an arbitrary app to assist users in interacting with that app.

However, rather than apply the accessibility API, or assist API or the like, to capture and reformat or re-present information in an app, the Data Transfer Tool leverages the functionality of such APIs to record the text and UI widgets displayed on the screen, along with their various properties, including, but not limited to, textual data, UI widget position, activity ID (e.g., app page ID), whether and how the user interacted with the widget (e.g., touch, swipe, keyboard entry, speech, gesture, etc.), information entered or selected by the user for a particular UI widget (e.g., user entered or selected attribute values), timestamp of the interaction, etc. This information is then processed by the Data Transfer Tool to derive a syntactic structure of the on-screen app content. Advantageously, use of the accessibility API, or assist API or the like, enables the Data Transfer Tool to extract content from arbitrary source apps without any modification to those arbitrary apps.

As discussed in further detail in the following paragraphs, the extracted content is used to create app models for arbitrary source apps. These app models are then user in combination with information extracted during subsequent user interaction with the corresponding source app (again via the accessibility API, or assist API or the like) to provide semantically meaningful tasks (e.g., actions and one or more corresponding attributes) to one or more destination applications that are authorized to receive those tasks.

Further, multiple different kinds of tasks can typically be performed by the user in any particular app. For example, a shopping app may support tasks including, but not limited to, adding an item to a cart, deleting an existing item from the cart, entering or reading an item review, etc. Consequently, merely capturing or extracting the values or attributes set in an app (e.g., the content of various textboxes or UI control states or selections) may not be sufficient to determine what task is being performed. Therefore, in various implementations, the Data Transfer Tool also captures operations invoked by the user (e.g., clicking an "add" vs. a "delete" button in a shopping app). Then, during app model inferencing, if the Data Transfer Tool is unable to distinguish between two or more tasks for the same application based merely on attribute values, the Data Transfer Tool further considers a sequence of user interactions that may define a particular task. Such sequences may be included along with the task attributes in the app model for the corresponding task.

2.2.1 Exemplary UI Scrapper Module Implementations:

In various implementations, the aforementioned UI scraper module is implemented as a background user-level service that interfaces with the accessibility API, or assist API or the like, to scrape content from foreground apps. In various implementations, the user may grant or deny permission for the Data Transfer Tool to apply the UI scraper module to extract data from all apps or one or more individually specified apps. The UI scraper module then receives callbacks from the accessibility API, or assist API or the like, whenever the API is active and receiving accessibility events including, but not limited to touch, button click, gestures, changes in page content, speech inputs, etc., in response to user interaction with a particular source app. The UI scraper module then logs (e.g., stores) all the events of interest, together with additional information including, but not limited to, an event ID, app ID, values or attributes (e.g., user content entry or selection), screen position of the corresponding UI widgets, etc., for which the UI scraper module receives a callback.

In various implementations, the use of computational resources is reduced by waiting to initiate the UI scraper until a source app from which tasks may be extracted, and for which an app model is available, is launched. Similarly, the use of computational resources is also reduced by not processing the event log unless the user's computing device includes one or more subscribing destination apps that are authorized to receive one or more of the tasks extracted from the foreground app. However, information may be extracted and stored for later processing at such time that a corresponding app model may become available.

2.3 App-Specific Semantic Models:

Parsing user interactions with the UI of arbitrary apps may be complex because even apps from the same category (e.g., flight booking) often differ substantially in their UI structure (e.g., the way various fields are named and laid out, how many app pages are utilized, etc.), how the app acquires user input (e.g., keyboard, touch, speech, gestures, etc.), etc.

Given the limited screen real estate available to apps, especially on small or handheld computing devices (e.g., smartphones, tablets, notebooks, laptops, media players, eBooks, smartwatches, etc.), app developers typically limit app UIs to a display of relevant information. Further, information in apps is typically presented in a structured way that makes it easy for users to interact with the app. As such, there tends to be relatively little noise or extraneous information in the presentation layer of most apps. Consequently, relatively simple app models can be constructed and applied in combination with the accessibility API, or assist API or the like, to extract presentation layer information from the app without requiring any OS or source app modifications. Such capabilities and features facilitate deployment of the Data Transfer Tool on a wide range of computing platforms and OSes and increase the efficiency of interaction of the Data Transfer Tool with arbitrary source apps.

Consequently, in various implementations, the Data Transfer Tool applies an app-specific semantic model (also referred to herein as an app model) to information extracted from the source app via the accessibility API, or assist API or the like. The app model is applied to populate attributes of a structured task template that defines a particular user action enabled by the source app. In various implementations, the Data Transfer Tool represents these attributes as generic key-value collections by providing a mechanism to tag data extracted from the presentation layer of the app with semantically meaningful labels using the structured task templates.

In various implementations, the Data Transfer Tool applies various natural language processing techniques to app UIs to perform automated extraction of app structure in order to automatically infer one or more app models. However, because of the enormous diversity in UI modalities in apps (even apps ostensibly directed to performing similar operations or actions), it is generally more computationally efficient to provide a guided app interaction process for generating app models.

For example, one guided process employed by the Data Transfer Tool directs users to point out and label semantically meaningful parts of the UI corresponding to predefined tasks. For example, the user may use a pointing device, gesture, speech-based input etc., to identify or otherwise label a location of one or more UI widgets of a source app along with an identity or definition of a corresponding user action (e.g., book flight, enter blog text, select item, etc.). This user-provided labeling, in combination with information extraction via the accessibility API, or assist API or the like, provides the Data Transfer Tool with sufficient data for automatically inferring an app model for subsequent use with the corresponding source app.

A different guided process (see Section 2.3.1, below) directs users to perform one or more particular directed operations or actions using a particular source app. As discussed in further detail in the following paragraphs, such guided app interaction processes enable the Data Transfer Tool to efficiently infer app models in response to directed human interaction with a particular source app.

Regardless of the model construction technique used, the app model construction process does not need to be performed or repeated by each user. In fact, once any app model has been created for any source app using any modeling technique, that app model can be made available to any user that may use the corresponding source app. For example, in various implementations, the Data Transfer Tool scans apps available on a user's computing device and then simply downloads one or more corresponding app models from a store, database, or library of pre-constructed app models. As such, any desired technique may be applied to construct or otherwise define app models for use with the Data Transfer Tool without departing from the intended scope of the concepts and features described herein.

2.3.1 App Model Construction Via Guided Human Interaction:

A wide variety of guided or directed human interactions with apps may be applied by the Data Transfer Tool in order to match known (e.g., directed) user interactions with content being selected or entered by the user and then displayed or rendered via the presentation layer of the app. For example, in various implementations, a human or artificial intelligence (AI) expert defines one of more "task templates" for each category (e.g., actions such booking a flight, adding items to a shopping cart, entering blog text, etc.), with placeholders for one or more attributes. One or more users then each execute the directed actions conforming to the specified template, and select or enter appropriate attribute values of their choice. In various implementations, one or more of these users are then led through an automatically constructed sequence of secondary tasks, each involving executing the original task but with one or more of the attribute values changed.

In other words, given an expert-specified task template for a particular source app or source app category, one or more predefined actions are automatically presented for execution by one or more users. Information extracted by the accessibility API, or assist API or the like, during execution of these predefined actions is then automatically related to the data obtained from the presentation layer to match particular user entered or selected attributes with particular actions and UI widgets or variables. In combination, this data is sufficient to enable the Data Transfer Tool to infer relationships between multiple actions and attributes associated with particular UI widgets of a source app for completing the task templates that are used to define the corresponding app model.

In various implementations, the app model learning or inferencing process is performed by applying a differencing approach, wherein the differences in a UI state between two related task executions is attributed to differences in the attribute values in the corresponding task instances. If any ambiguity remains, additional predefined task instances may be automatically generated and executed by one or more users in order to resolve the ambiguity.

Further, in various implementations, once an app model has been generated using such techniques, an app verification process may be performed by directing one or more users to perform additional predefined actions using the app. This verification process then continues by comparing the results of those additional predefined actions with results obtained from the app model. This verification process helps to resolve issues in the app model resulting from human errors and/or spurious inferences from app models due to correlated updates to multiple UI widgets in the case that the source app is updated. See Section 2.3.5 of this document for additional discussion regarding automated model updates in response source app changes or updates.

More specifically, in various implementations, the Data Transfer Tool initiates a guided human interaction process that instructs one or more users to perform one or more specific actions (e.g., book a flight, add an item to a shopping cart, add a review comment to a blog, initiate a communications session, play a media file, interact with a home automation system, etc.) using a particular source app. The Data Transfer Tool then applies the accessibility API, or assist API or the like, to log changes in the presentation layer of that app while each user performs each requested action. The Data Transfer Tool then applies an inference engine module to infer the semantics of the in-app content that is displayed on the screen, i.e., the meaning of the various UI widgets and relevant key-value pairs. For example, different "keys" could be used in different apps to refer to the same semantic information, e.g., the keys "origin", "source", and "dep city" may all be used in different flight booking apps to refer to the same semantic entity (e.g., departure city). Sometimes, the key is implicit, such as a key denoted by an image (e.g., separate icons for adult and child passenger counts), or even just screen position (e.g., the UI widget for the departure city is generally placed to the left of that for the arrival city, without the need for either field to be labeled).

In other words, the Data Transfer Tool automatically evaluates logged changes in the presentation layer to infer a mapping from the particular actions to particular UI widgets (e.g., text entry fields, sliders, radio buttons, drop-down boxes, etc.) for entry or selection of attributes and, optionally, additional information such as locations of those widgets on the display, timestamps, input method, etc. Each of the inferred mappings for a particular source app are then combined to create the overall app model for the particular source app.

In various implementations, the aforementioned guided human interaction process operates as a multi-stage process wherein the user is directed to execute a set of simple primary and secondary operations using the source app. For example, an example of a primary operation may be: "Book a flight between any two cities on any date". A subsequent secondary operation in the sequence may be: "Book a flight between the same two cities as before, but returning one day later." In this primary/secondary operation example, the inference process performed by the Data Transfer Tool would diff attribute values extracted from the presentation layer in response to user performance of the primary and secondary operations. In this primary/secondary scenario, it is likely that a single UI widget value (corresponding to the return date) would be different. Consequently, that widget would be labeled as "return date" in the corresponding app model.

In general, when performing operations associated with primary tasks, users may enter or select any suitable attribute values for the specific primary task instances that they execute when interacting with the UI widgets. Similar tasks in different apps may call for different input methods, e.g., to set a date, some apps present a textbox for date entry while others present various forms of calendar widgets. Then, depending on the primary task instance, for secondary or follow-on task instances, users may be directed to re-execute the task, with one or more attribute values changed. By applying the accessibility API, or assist API or the like, to observe changes to the overall presentation layer of the app UI while the user performs these primary and secondary tasks, the Data Transfer Tool can easily infer mappings from particular UI widgets (e.g., text entry fields, sliders, radio buttons, drop-down boxes, etc.) to particular actions relating to primary and secondary tasks. See Section 2.3.2, below, for a discussion of inferencing from this training data. As noted above, the inferred mappings for a particular app are then combined to create the overall app model for the particular app.

In other words, if the user is directed to change the contents of one text entry field relating to a particular action, then the particular relationship between that action and the corresponding text entry field can be inferred and mapped by simply observing changes in the presentation layer. Advantageously, this type of inference and mapping does not require the Data Transfer Tool to interpret or otherwise understand the meaning of either the text entry or UI Widget selection or the action being performed by the user. The observed relationship between the text entry field or UI widget and the action is sufficient to enable the Data Transfer Tool to populate the task template for use in constructing the corresponding app model.

Table 1, below, illustrates various examples of task templates. It should be understood that the task templates illustrated in Table 1 are provided for purposes of explanation and example are that the Data Transfer Tool is not intended to be limited to the use of these exemplary task templates.

TABLE 1

Exemplary Task Templates for Various App Categories

| App Category | Task Type | Directed Actions (Attributes Denoted by < . . . >) |
|---|---|---|
| Flight | Primary | Search for a one-way flight from a <source city> to a <destination city> on a certain date for a certain <number of passengers> in a certain <class of travel> |
| | Secondary | Search for a one-way flight using the same attribute values as in previous task but only changing the <source city> |
| | Secondary | Search for a one-way flight using the same attribute values as in previous task but only changing the <destination city> |
| | Secondary | . . . |
| Shopping | Primary | Browse for an <item> and add it to shopping cart |
| | Secondary | Delete the <item> from shopping cart |
| | Primary | Add a <quantity of two> of a different <item> to the shopping cart |
| | Secondary | Delete the <items> from the shopping cart |
| Recipe | Primary | Search for a <recipe> |
| | Secondary | Search for a different <recipe> |
| Transportation | Primary | Search for a route from a <source location> to a <destination> using a certain <mode of transport> |

TABLE 1-continued

Exemplary Task Templates for Various App Categories

| App Category | Task Type | Directed Actions (Attributes Denoted by < . . . >) |
|---|---|---|
| | Secondary | Search for route using same attribute values as in the previous task but only change the <source location> |
| | Secondary | . . . |
| Stock | Primary | Search for a <stock> quote |
| | Secondary | Search for a different <stock> quote |
| | Primary | Search for <stock> quote and add it to a favorites list |
| | Secondary | Search for a different <stock> quote and add it to the favorites list |
| Hotel | Primary | Search for hotel for a number of <guests> from a <start date> to an <end date> in a certain <city> |
| | Secondary | Search for a hotel using the same attribute values as in previous task but only changing the <guest> count |
| | Secondary | . . . |
| Weather | Primary | Search for weather conditions in a certain <city> |
| | Secondary | Search for weather conditions in different <city> |
| News | Primary | Search for a news <topic> |
| | Secondary | Search for a different news <topic> |
| Music | Primary | Search for songs by a certain <artist> and <genre> |
| | Secondary | Search for songs using the same attribute values as in previous task but only changing the <artist> |
| | Secondary | . . . |
| Social | Primary | Post a <status> on the social site |
| | Secondary | Post a different <status> on the social site |
| | Primary | Search for a <topic> on the social site |
| | Secondary | Search for a different <topic> on the social site |
| Communication | Primary | Post a <message> to a <contact> |
| | Secondary | Post a different <message> to the same <contact> |

Further, in various implementations, the Data Transfer Tool applies various inferencing techniques during model training in ways that either enable inferencing using fewer secondary tasks, or, alternately, that simplify app model inference by maximizing the amount of information gleaned from each secondary task. For example, in various implementations, the Data Transfer Tool considers an entity type of each attribute in the task template, and allows multiple attributes to be changed simultaneously in a secondary task, so long as they can be disambiguated based on their entity types.

For example, during model training, the source airport and number of passengers may be changed simultaneously because passengers represent a number that can be easily distinguished from an airport code or city name. However, the source airport and destination airport may not be simultaneously changed since the entity type (e.g., city names or locations) of both the source and destination airports are the same, thus making disambiguation more difficult. Further, even when the entity type for two attributes is the same, in various implementations, these attributes may be changed simultaneously so long as the change happens in a controlled manner that enables disambiguation (e.g., a secondary task could involve incrementing a number of adults by 1 and a number of children by a different amount, say 2. Similarly, as an example of non-numeric attributes, a secondary task could involve setting a source city to the same value as the destination city in the primary task, and the destination city to a new value.

Further, in various implementations, information extracted during performance of the directed actions is evaluated by the Data Transfer Tool to learn specific settings of attribute values supported by the corresponding UI Widget of the app (e.g., complete set of airport codes in a drop-down list of the app). In various implementations, these learned settings are optionally applied to run one or more verification task instances following app model construction. These verification task instances apply attribute values are drawn from the learned settings to verify consistency between the specified task and the inferences made from the corresponding task execution using the learned app model, and to update or correct the app model if necessary.

2.3.2 Inferencing from Training Task Data:

In general, guided training tasks, such as those discussed in Section 2.3.1 of this document, generate raw UI traces (captured via the accessibility API, or assist API or the like) comprising attribute values of UI variables or widgets (e.g., textboxes or other UI controls) in the app. In various implementations, these raw UI traces are filtered and processed in multiple steps, as shown below in the inference algorithm of Table 2 to infer attribute to UI mappings based on the predefined task templates. In particular, the exemplary pseudocode illustrated in Table 2 provides an inference algorithm that maps each attribute in the task template to corresponding UI variable(s) or widgets of the source app representing actions performed by the user. As noted above, any desired technique may be applied to construct or otherwise define app models for use with the Data Transfer Tool without departing from the intended scope of the concepts described herein. As such, the Data Transfer Tool is not limited to the exemplary inference-based modeling techniques illustrated in Table 2.

TABLE 2

Exemplary Inference Algorithm Pseudocode

```
Infer_App_Model(UI_Trace)
begin
    Num_Tasks = sizeof(UI_Trace);
    Num_Attributes = Num_Tasks − 1;
    for i = 0; i <= Num_Attributes; i + + do
        UI_Trace[i] = Filter_Out_Unnamed_Variables(UI_Trace[i]);
        UI_Trace[i] = Filter_Out_NonString_Variables(UI_Trace[i]);
        UI_Trace[i] = Filter_Out_All_But_Final_Value_Of_Variables(UI_Trace[i]);
    end for
    for i = 1; i <= Num_Attributes; i + + do
        UI_Diff_Set[i] = Diff(UI_Trace[i − 1], UI_Trace[i]);
        i + +;
    end for
    UI_Diff_Set = Filter_Out_Variables_With_Repeated_Occurences(UI_Diff_Set);
    App_Model = UI_Diff_Set;
end
```

In general, the exemplary inference algorithm illustrated in Table 2 processes the raw UI traces (e.g., "UI_Trace" captured via the accessibility API, or assist API or the like) from a user's directed interaction with the app. As illustrated in Table 2, in various implementations, the inference algorithm first filters out any UI variables from each UI trace for which the app developer has not assigned a name. The rationale for this filtering step is that for the relatively small subset of app variables that may be relevant to app model construction, app developers typically do assign a variable name.

In addition, as illustrated in Table 2, in various implementations, the inference algorithm filters out any non-string variables, e.g., any UI variables whose values are not text strings. The rationale for this filtering step is that it has been observed that restricting to variables with textual values was unlikely to eliminate relevant variables in typical apps for purposes of app model construction. For example, even UI widgets such as radio buttons tend to have textual values (e.g., "Economy", "Business", etc., in the context of class of travel). For controls such as check boxes, radio buttons, etc., the state of each control may be recorded via UI traces captured by the accessibility API, or assist API or the like, to determine which textual attribute value was selected via the control.

Further, in various implementations, each variable's value is logged in the raw UI trace captured by the accessibility API, or assist API or the like, whenever the value changes. A particular variable may occur multiple times in the UI trace (e.g., the user might set the passenger count to 1 and then change it to 2, before selecting "submit" or some corresponding UI control). However, while such changes may be relevant to a particular user interaction, such changes are not typically relevant to the inferred mapping between attributes and UI variable(s) of the source app for purposes of inferring the app model. Consequently, as illustrated by the inference algorithm in Table 2, all but the final value of each variable may be filtered out without reducing the accuracy of the inferred app model.

Next, also as illustrated in Table 2, With respect to the set of traces corresponding to the primary task and the subsequent secondary tasks, for each pair of successive tasks (which may correspond to the user executing a task and then the same task again, but with a change in the setting of one attribute), the inference algorithm computes the difference, e.g., UI_Diff_Set, comprising the variables whose values changed across the pair of successive tasks. Consequently, this difference set represents a candidate set of UI variables that may correspond to a particular attribute i.

As illustrated in Table 2, UI_Diff_Set is then further refined to create the app model by filtering out candidate variables that appear in the difference set for multiple attributes. These types of repeated occurrences of attributes suggests that the changes occurring in the variables from one task to the next are likely not due to an intentional change by the user of the changed attribute value. For example, a variable corresponding to the current time will periodically or continuously change in value between successive tasks, and hence will occur in the difference set of all attributes. However, such repeated changes are clearly not due to changes in the attribute value being entered or selected by the user. Consequently, as illustrated in Table 2, candidate UI variables evidencing continuous or periodic changes are filtered out of the difference set. As illustrated in Table 2, following the final filtering of the UI_Diff_Set, the inference algorithm outputs the refined difference set as "App_Model" which comprises those variables that are likely to be related to the corresponding attributes. The resulting app model can then be provided for use by other users.

However, it is possible that the resulting app model contains one or more incorrect mappings due to human error, e.g., the primary or secondary task (i.e., the directed actions) may have asked the user to change the source airport but the user inadvertently changed some other variable instead. To protect against such errors, in various implementations, the inferred app model may be tested against additional directed actions by a small subset of users. For example, this subset of users may be directed to execute additional training tasks for each app to determine whether there is a majority agreement between the inferred app model and new app models that are inferred for each of the subset of users in response each user's interaction with the app. For instance, with three users, if a certain variable v appears in the difference set for attribute i in the traces from at least two users, that variable is retained in the final app model, otherwise, it is filtered out. After any app model for a particular version of an app has been finalized, it may be provided to other users for use with local instances of the Data Transfer Tool. In other words, other users can simply consume the finalized version of the app model without participating in any of the model training phases involving directed actions and model inference.

Further, in various implementations, the Data Transfer Tool considers aliasing of attributes. In particular, the inferred app model maps each attribute to the corresponding UI variable(s) of an app. In most cases, an attribute maps onto just one variable or UI widget. However, in some cases, the attribute may map onto multiple variables, which is termed "aliasing." For example, when a user executes the task of adding a new item to the cart in a shopping app, a textbox corresponding to the item name and another textbox corresponding to the price might both change. Furthermore, for the small number of training tasks executed by users, the values appearing in both of these textboxes might be unique. In such cases, the above-described inference algorithm would not be able to tell which of the two textboxes constitutes an appropriate description of the item. In these cases, the Data Transfer Tool directs one or more users to perform one or more verification tasks to help refine the app model. For example, a user may be directed to perform an action to input or select an attribute (e.g., a variable value) relative to a particular UI control to validate a particular task of the app model.

2.3.4 Leveraging Implicit Training Data for Model Construction:

In the preceding discussion, training data was generated explicitly by having human users execute particular tasks (e.g., one or more predefined actions to enter or select attributes that were then mapped to particular UI controls or variables). However, as noted above, training data may also be obtained implicitly. For example, a user session with a particular app that involves a completed transaction often results in an external manifestation such as a confirmation email. Such confirmation emails, conforming to a standardized format (e.g., schema.org email templates), are used by a variety of online services and apps. In various implementations, the Data Transfer Tool applies the standardized format to match information extracted from the confirmation email with information obtained from the UI traces captured during user interaction with the app. This provides another mechanism that enables the Data Transfer Tool to learn or infer the mappings that define semantics of the in-app content. Further, implicit training data may be combined with explicit training data to construct or validate app models inferred using any desired modeling technique.

As with the explicit generation of training data discussed above, if any ambiguity remains after the email to UI trace matching step, e.g., because the same value occurs multiple times in a transaction (e.g., 2 passengers travelling on 2 July), data from confirmation emails for additional transactions, whether by the same user or a different user, can help with disambiguation. Once the mapping between UI elements and the components of the structured confirmation email has been established, the Data Transfer Tool can then apply the resulting app model to extract the semantics of in-app information resulting from user interaction with the app, even when that interaction does not result in a completed transaction (and hence no confirmation email).

2.3.5 Model Updates for New App Versions:

Apps are often updated for any of a number of reasons, e.g., add or remove features, change UI structure, fix bugs, change variable names, etc. Depending on the changes made to an app, the corresponding app model may decrease in accuracy or become obsolete. Such issues are addressed by various implementations of the Data Transfer Tool by leveraging a static app binary checking process in combination with UI widget position and value-based matching to automatically update app models when corresponding source apps are updated.

For example, in various implementations, the Data Transfer Tool performs an automated static analysis of binaries of apps to determine whether variable names were added or removed relative to the variables included in the app model for the prior version of the app. In cases where most or all of the variable names in the existing app model also exist in the binary of the new app version, it is likely that the existing app model and the corresponding mapping of attributes to variable names remains valid across multiple versions of the app.

As noted above, in various implementations, the Data Transfer Tool optionally applies the accessibility API, or assist API or the like, to capture on-screen position information of the UI widgets of the app when capturing UI traces for use in constructing app models. Consequently, in various implementations, the Data Transfer Took leverages this UI widget position information in combination with corresponding key-value pairs in the app model to validate one or more of the tasks of the app model against the new or updated app version.

For example, the Data Transfer Tool can compare a normalized x, y location of a UI widget on the screen and a set of values observed (via UI traces) for the key during actual user interaction with the app. Then, when an app update occurs, if the developer changes the variable names (key names) and/or location of the corresponding UI widget on the screen, the Data Transfer Tool looks for the nearest key in a spatial and value domain to find the new key corresponding to the task attribute. This information is then applied to update the existing app model to correspond to the new app version. While this approach is not always 100 percent accurate, it has been observed to significantly reduce errors in the app model relative to new app versions. Further, whatever errors remain in the app model after this process may then be corrected using any combination of the explicit or implicit error correction and training techniques described above.

2.4 Exemplary Cross-App Sharing Apps:

As noted above, the tasks extracted by the Data Transfer Tool from arbitrary source apps may be provided to one or more authorized subscribing apps. However, because these extracted tasks may also be stored for later use, those tasks can be indexed, sorted, and otherwise processed to enable a wide variety of new apps and services that subscribe to those tasks. The following paragraphs describe five examples of some of the many new apps and services that may be constructed based on the availability of stored or logged tasks and on receipt of real time task notifications in response to task subscriptions. These five exemplary apps are based on a mashup of the user's data de-siloed from various travel and messaging apps by creating various apps that subscribe to tasks that are extracted from those travel and messaging apps during user interaction. Uses of the stored or logged tasks provided by the Data Transfer are clearly not limited to the examples described below or to interaction with travel or messaging apps.

For example, some of the new cross-app data sharing apps enabled by the subscription to tasks extracted from the Data Transfer Tool include, but are not limited to:

1) A history app that collates and presents an interactive timeline of user activities across task categories derived from multiple apps, including, but not limited to, shopping, movies, travel, messaging, etc.
2) A travel alert app that automatically schedules price alerts for flights (or other travel modes) searched for (but not booked) by the user.
3) A limousine service app that automatically launches the user's preferred limo or cab app with pick-up time based on flight departure (or arrival) and the drop-off (or pick-up) location set to the appropriate airport when a flight is booked.
4) A smart messaging app that presents a unified view of users and messages combined from different messaging apps.
5) An in-app assistant app that runs as a background service and provides pop-ups or other alert types relative to any arbitrary source app with which the user is currently interacting.

2.4.1 Exemplary History App:

In various implementations, the exemplary history app constructs and presents a unified timeline of activities that have been performed inside multiple different apps, regardless of whether there is any relation or interaction capabilities between those multiple apps. The history app constructs this unified task timeline by subscribing to multiple task categories, including, but not limited to, shopping, movies, cuisine search, flight, hotel, rental car bookings, messaging, etc. The history app provides a search feature to index into tasks using filters such as time, keywords and task type.

2.4.2 Exemplary Travel Alert App:

In various implementations, the exemplary travel alert app subscribes to various travel search and travel booking events extracted from multiple travel apps and then creates a price alert to inform the user of changes in travel prices. Travel prices may be obtained by the travel alert app by automatically periodically querying one or more travel sites or services to determine travel prices using travel modes corresponding to the user travel search events.

For example, in the context of airline flights, the exemplary travel alert app may subscribe to "flight search" and "flight booking" events from multiple flight apps. Then, when the travel alert app receives "flight search" events for particular origin and destination airports (on potentially different dates), but does not receive a "flight booking" notification or task, it can be presumed that the user may be checking flight prices. Consequently, the travel alert app initiates an alert process that automatically generates a price change alert or notification for the range of dates seen in the travel search events.

In various implementations, the travel alert app may either present this alert or notification directly to the user, or it can generate an alert task that is available for subscription by other apps, such as a messaging app for example. In either case, if the price alert triggers with a price change in excess of a predefined or user-specified threshold, e.g., 10% higher or lower than the price seen from the search events, the travel alert app may then alert or notify the user. In various implementations, if the travel alert app subsequently receives a "flight booking" event relating to the flight search events, the alert process may be dismissed, thereby terminating future price change alerts.

2.4.3 Exemplary Limousine Service App:

In various implementations, the limousine service app subscribes to travel itinerary tasks (e.g., flight event events, calendar events, etc.). Further, in various implementations, the limousine service app infers the user's home and office address using location data at different times of day, or current GPS location at the time that a limousine or cab may be desired by the user. Then, when the user books a flight (or other travel mode) from some location, the limousine service app provides a single-touch limousine or cab booking that launches the user's preferred limo or cab app with numerous prepopulated fields (which may be changed or updated by the user) based on task subscriptions of the limousine service app.

For example, based on task subscriptions, the limousine service app may prepopulate various fields including, but not limited to: name, number of passengers, pick-up location set to user home or office address (depending on the day of week and time of the flight) or current location; destination address or location automatically set to the airport (or other departure location such as a train station); pick-up time set based on travel time estimates between home/office and the airport. Similarly, in various implementations, the limousine service app may provide similar single-touch reservations to book a limousine or cab between the arrival airport and hotel (if a hotel booking event or subscribed task has been received by the limousine service app) and a rental-car booking event or subscribed task is not seen. Similarly, in various implementations, the limousine service app provides single-touch reservations to book a limousine or cab between the original departure airport and the user's home or office (or other location) based on the user's scheduled return flight.

2.4.4 Exemplary Smart Messaging App:

In various implementations, the smart messaging app subscribes to messaging events or tasks, which trigger whenever a new message is sent to or received from any of the messaging apps utilized by the user (or some user specified subset of those messaging apps). The Data Transfer Tool then infers the messaging app name (i.e., which messaging app sent or received a message), user name or messaging handle or ID, and the message content whenever a messaging event is triggered via sent or received messages. In various implementations, the smart messaging app then constructs and presents a UI-based mashup of all messaging apps utilized by the user, wherein a combined view of all of the user's messages can be viewed in one place. In addition, in various implementations, for apps that support deep linking (e.g., Skype®), the smart messaging app may enable user selection of a particular message to launch the corresponding app and directly navigate to the appropriate page in that app so that the user may continue his messaging in that app, if he so desires.

2.4.2 In-App Assistant App:

In various implementations, the in-app assistant app runs as a background process that subscribes to the tasks (e.g., user entered or selected data) being extracted in real-time from an arbitrary app with which the user is interacting. The in-app assistant app then retrieves and formats a relevant response from a local or remote data source in response to a search or query based on the content of subscribed task. The in-app assistant app then present the relevant response in real-time via any alert or notification technique, including, but not limited to, pop-ups, overlays, speech-based alerts, etc. This response by the in-app assistant app presents relevant information to the user based on the content of the subscribed tasks.

For example, assume that the user is communicating via a messaging-type source app for which an app model exists. If the user enters or receives a message via that source app regarding a particular topic, the Data Transfer Tool will automatically generate a corresponding task comprising a message sent or received action having attributes relating to the particular topic (e.g., movie, recipe, current news event, music, celebrity personality, weather, etc.). Assuming that the in-app assistant is authorized and subscribed to receive that task, the in-app assistant will then automatically generates a response (e.g., pop-up, overlay, speech, etc.) that provides real-time information relevant to the particular topic identified in that task. For example, assuming that the task references a particular movie, the in-app assistant may generate real-time responses (via internet searches or other searches or queries) including but not limited to, local movie theaters showing the movie with times and prices, movie reviews, etc.

Advantageously, the in-app assistant app improves user interaction experience by providing information to the user that is relevant to real-time actions and attributes in arbitrary source apps while the user is interacting with source apps without in any way modifying the source code of that arbitrary source app. As such, the in-app assistant app improves the functionality of arbitrary source apps by presenting relevant information to users regardless of the structure or features of the arbitrary source app.

In other words, the in-app assistant app may run constantly in the background, and have subscriptions to some or all of the tasks scraped or extracted from some or all of the arbitrary source apps that have been modeled. The in-app assistant app then provides relevant information whenever a task or informational item is extracted from some arbitrary source app by the Data Transfer Tool and provided as a subscribed task to the in-app assistant. As such, the in-app assistant app augments existing unmodified source apps in response to information extracted from those unmodified source apps.

In various implementations, the response provided by the in-app assistant app is user selectable. As such, the user can optionally click on or otherwise select or respond to the information being presented by the in-app assistant app, e.g., click on a hyperlink "Movie Times" to see, hear, or otherwise interact with a list of nearby movie times presented in response to mention of a particular movie in a messaging app. User input either in the arbitrary source apps, or in response to any information presented to the user by the in-app assistant app, can be textual, interaction with GUI controls, gesture-based, speech-based, or any combination of such input modalities.

In various implementations, the in-app assistant app suggests information to be entered into third-party apps that are not themselves modified to subscribe to tasks extracted by the Data Transfer Tool. In this case, an app model created for that third-party app will enable the in-app assistant app to determine what information is to be entered or selected for a particular UI widget of the third-party app. The in-app assistant app may then check to see whether it has any tasks matching that UI widget. If so, the in-app assistant app can initiate a pop-up or the like suggesting the information to be entered or selected. Further, in various implementations, the in-app assistant app automatically copies relevant attributes of the task to the OS or app clipboard so that the user can simply past the suggested information into the UI widget of that third-party app.

2.5 Additional Implementations of the Data Transfer Tool:

The following paragraphs briefly introduce a variety of additional uses and implementations of the Data Transfer Tool. Each of the following exemplary uses and implementations are intended to be understood in view of the preceding discussion.

In various implementations, the Data Transfer Tool models user behaviors with respect to various applications. For example, if the Data Transfer Tool observes that particular sequences of tasks are generated by different source apps, the Data Transfer Tool may use those observations to automatically initiate tasks or suggest actions. For example, if a user is observed (via generation of tasks) to frequently initiate a cab reservation app following a flight booking app, the Data Transfer can automatically initiate the cab reservation app (or ask the user if that app should be initiated) as soon as the user books a flight. In other words in various implementations, the data Transfer Tool may automatically initiate one or more third-party apps in response to user interaction with other source apps. In addition, the Data Transfer Tool may automatically populate one or more data entry or selection fields of the automatically initiated app based on one or more tasks scrapped from one or more modeled source apps with which the user has been interacting.

In various implementations, the Data Transfer Tool mines in-app information from arbitrary source apps that is obtained by scraping content from the arbitrary source app to model user behaviors (e.g., ordering pizza every Friday night, searching particular topics, joining or participating in various organizations or blogs, etc.). These modeled user behaviors are then applied by the Data Transfer Tool to automatically customize one or more third-party apps or digital assistants.

Relevant sponsored content and/or sponsored apps are presented by various implementations of the Data Transfer Tool (or the aforementioned in-app assistant app) in response to information scraped from modeled source apps by the Data Transfer Tool.

In cases that a particular user interacts with multiple computing devices, the Data Transfer Tool can scrape information from source apps run on one of those computing devices and provide corresponding tasks to apps running on one or more of the user's other devices. This type of data transfer can be accomplished using any desired wired or wireless communications mechanism.

Similarly, devices of additional users (e.g., family members, friends, business associates, etc.) may be authorized (on a per-device level, a per-user-level, or a per-task level) to receive data scraped from any source application of a particular user. This type of data transfer can be accomplished using any desired wired or wireless communications mechanism.

In various implementations, anonymized scrapped data may be provided to arbitrary users. For example, if a large number of users that interact with "app A" subsequently interact with "app B," or perform a specific action (e.g., go to a particular restaurant in Seattle after booking a flight to Seattle), the Data Transfer Tool (via the aforementioned in-app assistant) can suggest that users interacting with "app A" also execute "app B" (or perform the action such as going to the restaurant in Seattle). In various implementations, the Data Transfer Tool requests user permission prior to including their anonymized app usage or actions as recommendations to other users.

In various implementations, the Data Transfer Tool scrapes information from arbitrary apps, whether or not those apps are modeled, and can then copy or paste some or all of the scraped information to any desired text, note, word processing app, email program, messaging app, etc. For example, a user-accessible data store that includes either or both structured data (e.g., tasks) and unstructured data (e.g., raw scraped data) can be selected and copied as a group or on an element-by-element basis into arbitrary apps.

The Data Transfer Tool also enables a variety of smart messaging apps. For example, the Data Transfer Tool can, over time, can learn a preferred messaging app used by a user for each of a plurality of different contacts. The Data Transfer Tool can then automatically initiate the preferred communications app for a particular contact whenever the Data Transfer Tool scrapes data relating to that contact from any app with which the user is interacting. For example, if the user clicks on a contact name in an any arbitrary app, that user interaction is scrapped by the Data Transfer Tool, which then initiates a communications app that has been modeled/learned as being the preferred app for that particular contact. In other words, the Data Transfer Tool can initiate particular third-party apps in response to information scrapped from any arbitrary app with which the user is interacting.

In various implementations, the Data Transfer Tool automatically moves or copies information from one application to another to act as a bridge between those applications. For example, assume that the user prefers a first communications app to a second communications app, and the contact he is messaging with prefers the second communications app. In this case, the user can run both apps, and the Data Transfer Tool can scrape messages received by the second communications app from the contact and populate the first communications app with those scrapped messages. Similarly, the Data Transfer Tool can scrape user-entered messages from the first app and populate those messages into the second communications app for transmission to the contact. As a result, the user can communicate with the contact in real-time even if the user and the contact are each using different and incompatible messaging apps.

Figure 3:
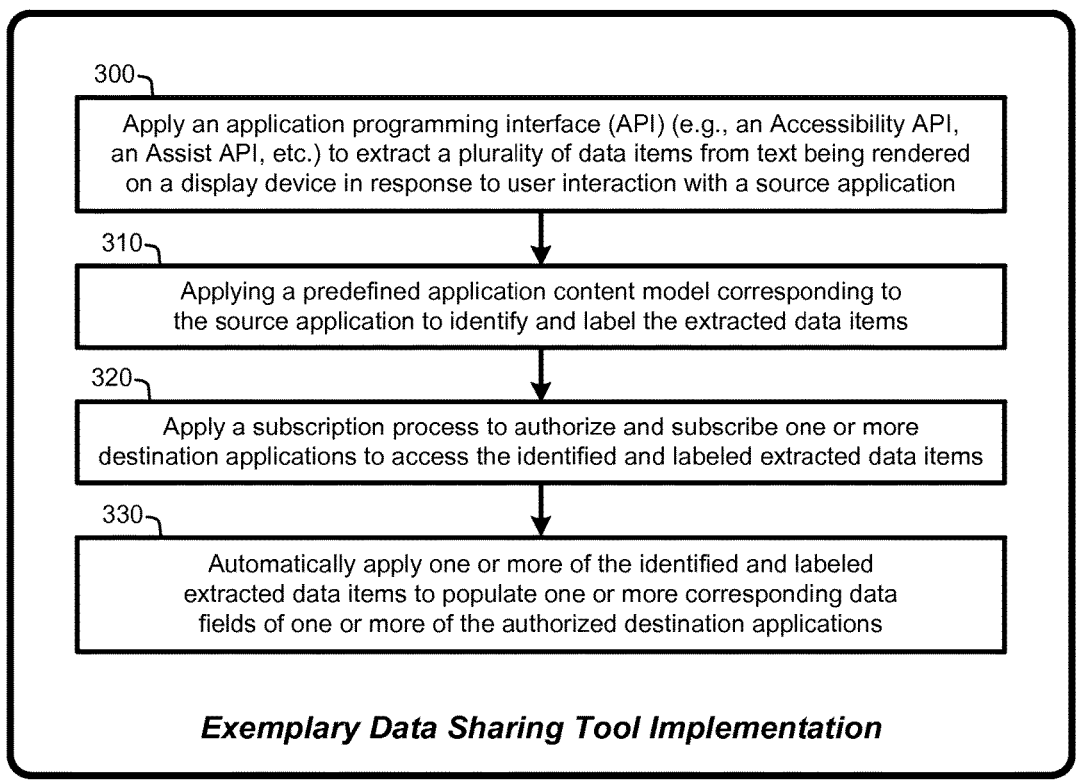
FIG. 3 provides a general system flow diagram that illustrates an exemplary implementation of the Data Transfer Tool, as described herein.
Figure 4:
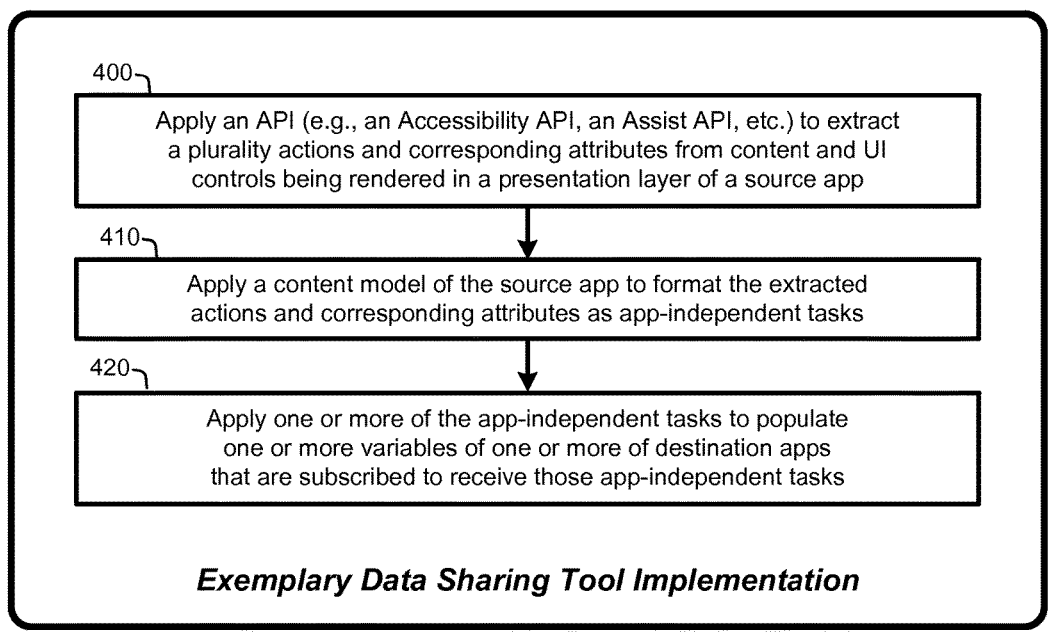
FIG. 4 provides a general system flow diagram that illustrates an exemplary implementation of the Data Transfer Tool, as described herein.
Figure 5:
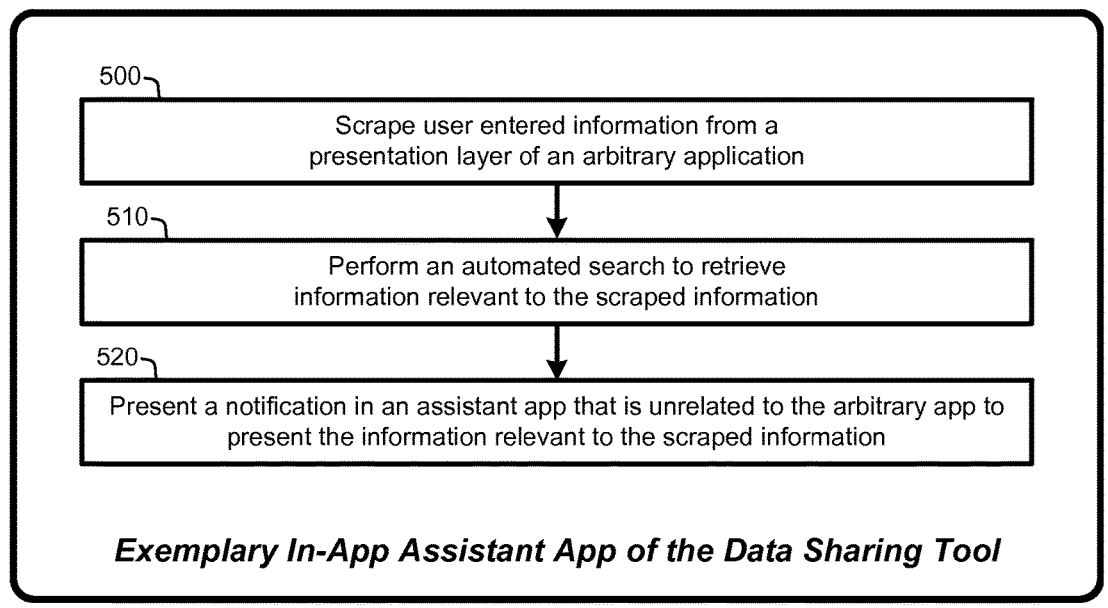
FIG. 5 provides a general system flow diagram that illustrates an exemplary implementation of an in-app assistant app of the Data Transfer Tool, as described herein.

3.0 Operational Summary of the Data Transfer Tool:

The processes described above with respect to FIG. 1 and FIG. 2, and in further view of the detailed description provided above in Sections 1 and 2, are illustrated by the general operational flow diagrams of FIG. 3, FIG. 4 and FIG. 5. In particular, FIG. 3, FIG. 4 and FIG. 5 provide an exemplary operational flow diagrams that summarize the operation of some of the various implementations of the Data Transfer Tool. FIG. 3, FIG. 4 and FIG. 5 are not intended to provide exhaustive representations of all of the various implementations of the Data Transfer Tool described herein, and the implementations represented in FIG. 3, FIG. 4 and FIG. 5 are provided only for purposes of explanation.

Further, any boxes and interconnections between boxes that may be represented by broken or dashed lines in any of FIG. 3, FIG. 4 and FIG. 5 represent optional or alternate implementations of the Data Transfer Tool described herein, and any or all of these optional or alternate implementations, as described below, may be used in combination with other alternate implementations that are described throughout this document.

In general, as illustrated by FIG. 3, in various implementations, the Data Transfer Tool begins operation by applying (300) an accessibility API, or assist API or the like, to extract a plurality of data items from text being rendered on a display device in response to user interaction with a source application. In various implementations, the Data Transfer Tool then applies (310) a predefined application content model corresponding to the source application to identify and label the extracted data items. In various implementations, the Data Transfer Tool then applies (320) a subscription process to authorize and subscribe one or more destination applications to access the identified and labeled extracted data items. Finally, in various implementations, the Data Transfer Tool automatically applies (330) one or more of the identified and labeled extracted data items to populate one or more corresponding data fields of one or more of the authorized destination applications.

In general, as illustrated by FIG. 4, in various implementations, the Data Transfer Tool begins operation by applying (400) an accessibility API, or assist API or the like, to extract a plurality actions and corresponding attributes from content and UI controls being rendered in a presentation layer of a source app. In various implementations, the Data Transfer Tool then applies (410) a content model of the source app to format the extracted actions and corresponding attributes as app-independent tasks. Finally, in various limitations, the Data Transfer Tool applies (420) one or more of the app-independent tasks to populate one or more variables of one or more of destination apps that are subscribed to receive those app-independent tasks.

In general, as illustrated by FIG. 5, in various implementations, an in-app assistant app of the Data Transfer Tool begins operation by scraping (500) user entered information from a presentation layer of an arbitrary application. In various implementations, the in-app assistant app of the Data Transfer Tool then performs (510) an automated search to retrieve information relevant to the scraped information. Finally, in various implementations, the in-app assistant app of the Data Transfer Tool then presents (520) a notification in an assistant app that is unrelated to the arbitrary app to present the information relevant to the scraped information 4.0 Exemplary Implementations of the Data Transfer Tool:

The following paragraphs summarize various examples of implementations that may be claimed in the present document. The implementations summarized below are not intended to limit the subject matter that may be claimed in view of the detailed description of the Data Transfer Tool. Further, any or all of the implementations summarized below may be claimed in any desired combination with some or all of the implementations described throughout the detailed description and any implementations illustrated in one or more of the figures, and any other implementations and examples described below. The following implementations and examples are intended to be understood in view of the detailed description and figures described throughout this document.

In various implementations, a Data Transfer Tool is implemented by means, processes or techniques for extracting, labeling and storing user data siloed by a source application so that the stored data can be shared across and between a plurality of authorized destination applications to improve user interaction efficiency with the authorized applications.

As a first example, in various implementations, a computer-implemented process is implemented via means, processes or techniques for applying an API, such as, for example, an accessibility API, or assist API or the like, to extract a plurality of data items from text being rendered on a display device in response to user interaction with a source application. This computer-implemented process then applies a predefined application content model corresponding to the source application to identify and label the extracted data items. In various implementations, a subscription or other authorization process is applied to authorize and subscribe one or more destination applications to access the identified and labeled extracted data items. The computer-implemented process then automatically applies one or more of the identified and labeled extracted data items to populate one or more corresponding data fields of one or more of the authorized destination applications.

Figure 6:
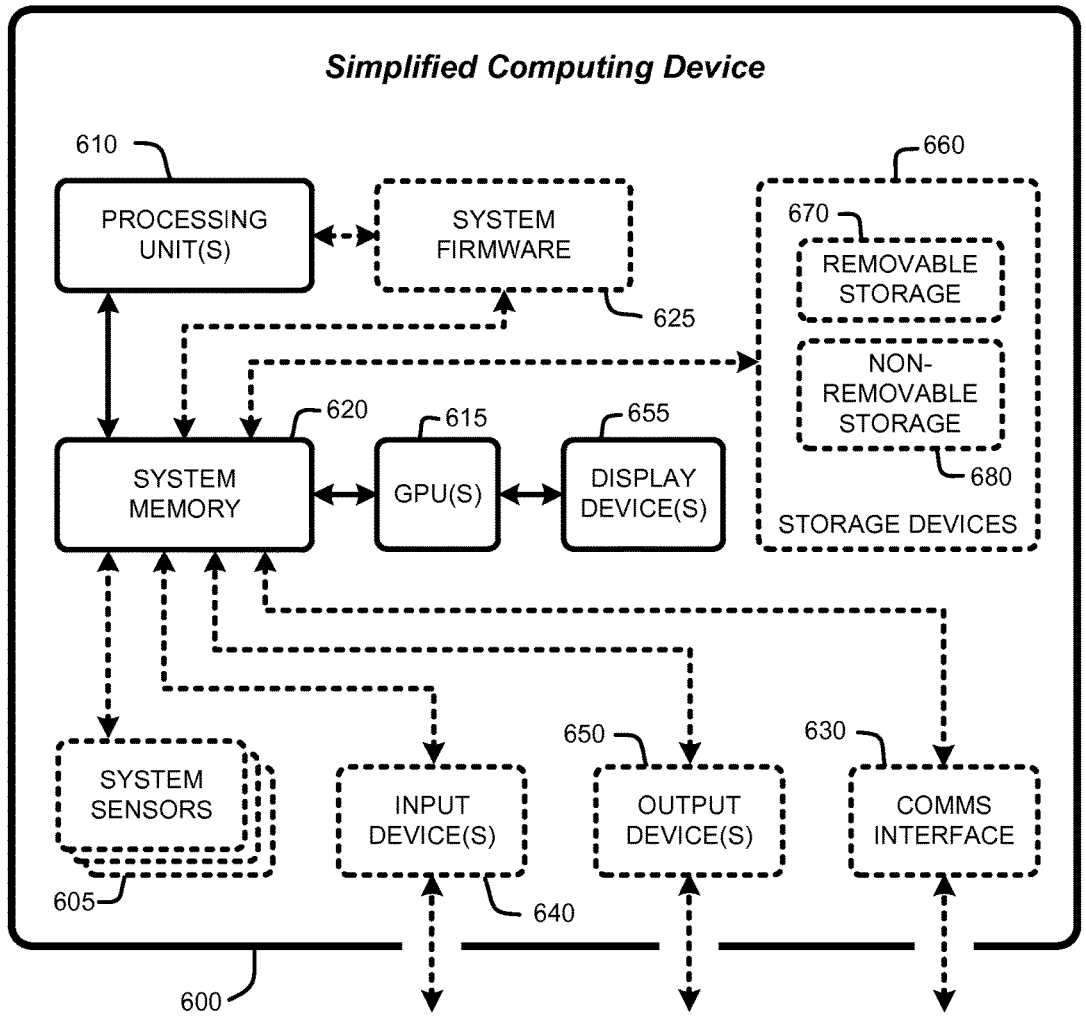
FIG. 6 provides a general system diagram depicting a simplified general-purpose computing device having simplified computing and I/O capabilities for use in effecting various implementations of the Data Transfer Tool, as described herein.

5.0 Exemplary Operating Environments:

The Data Transfer Tool implementations described herein are operational within numerous types of general purpose or special purpose computing system environments or configurations. FIG. 6 illustrates a simplified example of a general-purpose computer system on which various implementations and elements of the Data Transfer Tool, as described herein, may be implemented. Any boxes that are represented by broken or dashed lines in the simplified computing device 600 shown in FIG. 6 represent alternate implementations of the simplified computing device. As described below, any or all of these alternate implementations may be used in combination with other alternate implementations that are described throughout this document.

The simplified computing device 600 is typically found in devices having at least some minimum computational capability such as personal computers (PCs), server computers, handheld computing devices, laptop or mobile computers, communications devices such as cell phones and personal digital assistants (PDAs), multiprocessor systems, microprocessor-based systems, set top boxes, programmable consumer electronics, network PCs, minicomputers, mainframe computers, and audio or video media players.

To allow a device to realize the Data Transfer Tool implementations described herein, the device should have a sufficient computational capability and system memory to enable basic computational operations. In particular, the computational capability of the simplified computing device 600 shown in FIG. 6 is generally illustrated by one or more processing unit(s) 610, and may also include one or more graphics processing units (GPUs) 615, either or both in communication with system memory 620. The processing unit(s) 610 of the simplified computing device 600 may be specialized microprocessors (such as a digital signal processor (DSP), a very long instruction word (VLIW) processor, a field-programmable gate array (FPGA), or other micro-controller) or can be conventional central processing units (CPUs) having one or more processing cores and that may also include one or more GPU-based cores or other specific-purpose cores in a multi-core processor.

In addition, the simplified computing device 600 may also include other components, such as, for example, a communications interface 630. The simplified computing device 600 may also include one or more conventional computer input devices 640 (e.g., touchscreens, touch-sensitive surfaces, pointing devices, keyboards, audio input devices, voice or speech-based input and control devices, video input devices, haptic input devices, devices for receiving wired or wireless data transmissions, and the like) or any combination of such devices.

Similarly, various interactions with the simplified computing device 600 and with any other component or feature of the Data Transfer Tool, including input, output, control, feedback, and response to one or more users or other devices or systems associated with the Data Transfer Tool, are enabled by a variety of Natural User Interface (NUI) scenarios. The NUI techniques and scenarios enabled by the Data Transfer Tool include, but are not limited to, interface technologies that allow one or more users user to interact with the Data Transfer Tool in a "natural" manner, free from artificial constraints imposed by input devices such as mice, keyboards, remote controls, and the like.

Such NUI implementations are enabled by the use of various techniques including, but not limited to, using NUI information derived from user speech or vocalizations captured via microphones or other input devices 640 or system sensors 605. Such NUI implementations are also enabled by the use of various techniques including, but not limited to, information derived from system sensors 605 or other input devices 640 from a user's facial expressions and from the positions, motions, or orientations of a user's hands, fingers, wrists, arms, legs, body, head, eyes, and the like, where such information may be captured using various types of 2D or depth imaging devices such as stereoscopic or time-of-flight camera systems, infrared camera systems, RGB (red, green and blue) camera systems, and the like, or any combination of such devices. Further examples of such NUI implementations include, but are not limited to, NUI information derived from touch and stylus recognition, gesture recognition (both onscreen and adjacent to the screen or display surface), air or contact-based gestures, user touch (on various surfaces, objects or other users), hover-based inputs or actions, and the like. Such NUI implementations may also include, but are not limited to, the use of various predictive machine intelligence processes that evaluate current or past user behaviors, inputs, actions, etc., either alone or in combination with other NUI information, to predict information such as user intentions, desires, and/or goals. Regardless of the type or source of the NUI-based information, such information may then be used to initiate, terminate, or otherwise control or interact with one or more inputs, outputs, actions, or functional features of the Data Transfer Tool.

However, it should be understood that the aforementioned exemplary NUI scenarios may be further augmented by combining the use of artificial constraints or additional signals with any combination of NUI inputs. Such artificial constraints or additional signals may be imposed or generated by input devices 640 such as mice, keyboards, and remote controls, or by a variety of remote or user worn devices such as accelerometers, electromyography (EMG) sensors for receiving myoelectric signals representative of electrical signals generated by user's muscles, heart-rate monitors, galvanic skin conduction sensors for measuring user perspiration, wearable or remote biosensors for measuring or otherwise sensing user brain activity or electric fields, wearable or remote biosensors for measuring user body temperature changes or differentials, and the like. Any such information derived from these types of artificial constraints or additional signals may be combined with any one or more NUI inputs to initiate, terminate, or otherwise control or interact with one or more inputs, outputs, actions, or functional features of the Data Transfer Tool.

The simplified computing device 600 may also include other optional components such as one or more conventional computer output devices 650 (e.g., display device(s) 655, audio output devices, video output devices, devices for transmitting wired or wireless data transmissions, and the like). Typical communications interfaces 630, input devices 640, output devices 650, and storage devices 660 for general-purpose computers are known to those skilled in the art, and will not be described in detail herein.

The simplified computing device 600 shown in FIG. 6 may also include a variety of computer-readable media. Computer-readable media can be any available media that can be accessed by the computing device 600 via storage devices 660, and include both volatile and nonvolatile media that is either removable 670 and/or non-removable 680, for storage of information such as computer-readable or computer-executable instructions, data structures, program modules, or other data.

Computer-readable media includes computer storage media and communication media. Computer storage media refers to tangible computer-readable or machine-readable media or storage devices such as digital versatile disks (DVDs), blu-ray discs (BD), compact discs (CDs), floppy disks, tape drives, hard drives, optical drives, solid state memory devices, random access memory (RAM), read-only memory (ROM), electrically erasable programmable read-only memory (EEPROM), CD-ROM or other optical disk storage, smart cards, flash memory (e.g., card, stick, and key drive), magnetic cassettes, magnetic tapes, magnetic disk storage, magnetic strips, or other magnetic storage devices. Further, a propagated signal is not included within the scope of computer-readable storage media.

Retention of information such as computer-readable or computer-executable instructions, data structures, program modules, and the like, can also be accomplished by using any of a variety of the aforementioned communication media (as opposed to computer storage media) to encode one or more modulated data signals or carrier waves, or other transport mechanisms or communications protocols, and can include any wired or wireless information delivery mechanism. The terms "modulated data signal" or "carrier wave" generally refer to a signal that has one or more of its characteristics set or changed in such a manner as to encode information in the signal. For example, communication media can include wired media such as a wired network or direct-wired connection carrying one or more modulated data signals, and wireless media such as acoustic, radio frequency (RF), infrared, laser, and other wireless media for transmitting and/or receiving one or more modulated data signals or carrier waves.

Furthermore, software, programs, and/or computer program products embodying some or all of the various Data Transfer Tool implementations described herein, or portions thereof, may be stored, received, transmitted, or read from any desired combination of computer-readable or machine-readable media or storage devices and communication media in the form of computer-executable instructions or other data structures. Additionally, the claimed subject matter may be implemented as a method, apparatus, or article of manufacture using standard programming and/or engineering techniques to produce software, firmware 625, hardware, or any combination thereof to control a computer to implement the disclosed subject matter. The term "article of manufacture" as used herein is intended to encompass a computer program accessible from any computer-readable device, or media.

The Data Transfer Tool implementations described herein may be further described in the general context of computer-executable instructions, such as program modules, being executed by a computing device. Generally, program modules include routines, programs, objects, components, data structures, and the like, that perform particular tasks or implement particular abstract data types. The Data Transfer Tool implementations may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Additionally, the aforementioned instructions may be implemented, in part or in whole, as hardware logic circuits, which may or may not include a processor.

Alternatively, or in addition, the functionality described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so on.

6.0 Other Implementations:

The foregoing description of the Data Transfer Tool has been presented for the purposes of illustration and description. It is not intended to be exhaustive or to limit the claimed subject matter to the precise form disclosed. Many modifications and variations are possible in light of the above teaching. Further, any or all of the aforementioned alternate implementations may be used in any combination desired to form additional hybrid implementations of the Data Transfer Tool. It is intended that the scope of the Data Transfer Tool be limited not by this detailed description, but rather by the claims appended hereto. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other equivalent features and acts are intended to be within the scope of the claims.

What has been described above includes example implementations. It is, of course, not possible to describe every conceivable combination of components or methodologies for purposes of describing the claimed subject matter, but one of ordinary skill in the art may recognize that many further combinations and permutations are possible. Accordingly, the claimed subject matter is intended to embrace all such alterations, modifications, and variations that fall within the spirit and scope of detailed description of the Data Transfer Tool described above.

In regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the foregoing implementations include a system as well as a computer-readable storage media having computer-executable instructions for performing the acts and/or events of the various methods of the claimed subject matter.

There are multiple ways of realizing the foregoing implementations (such as an appropriate application programming interface (API), tool kit, driver code, operating system, control, standalone or downloadable software object, or the like), which enable applications and services to use the implementations described herein. The claimed subject matter contemplates this use from the standpoint of an API (or other software object), as well as from the standpoint of a software or hardware object that operates according to the implementations set forth herein. Thus, various implementations described herein may have aspects that are wholly in hardware, or partly in hardware and partly in software, or wholly in software.

The aforementioned systems have been described with respect to interaction between several components. It will be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (e.g., hierarchical components).

Additionally, one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known to enable such interactions.

What is claimed is:

1. A computer-implemented process, comprising:
applying an application programming interface (API) to extract a plurality of data items from a presentation layer of an operating system executing on a computing device, the presentation layer causing text to be rendered on a display device in response to user interaction with a source application executing under the operating system on the computing device;
applying a predefined application content model corresponding to the source application to identify and label the extracted data items;
applying a subscription process to authorize and subscribe one or more destination applications to access the identified and labeled extracted data items; and
automatically applying one or more of the identified and labeled extracted data items to populate one or more corresponding data fields of one or more of the authorized destination applications.

2. The computer-implemented process of claim 1 further comprising:
perform an automated search to retrieve information relevant to one or more of the extracted data items; and
present a notification in an assistant app that is unrelated to either the source application or the destination applications to present the retrieved information relevant to one or more of the extracted data items.

3. The computer-implemented process of claim 2 further comprising presenting the notification in the assistant app as an overlay on the source application.

4. The computer-implemented process of claim 2 further comprising presenting the notification in the assistant app as an overlay on one or more of the destination applications.

5. The computer-implemented process of claim 2 further comprising presenting sponsored content in the notification.

6. The computer-implemented process of claim 1 further comprising automatically updating the application content model when an analysis of the source application indicates changes to the source application binaries.

7. The computer-implemented process of claim 1 further comprising:
 modeling user behaviors with respect to the source application; and
 automatically initiating one or more destination applications in response to the modeled user behaviors and one or more of the extracted data items.

8. The computer-implemented process of claim 1 further comprising:
 modeling user behaviors with respect to one or more of the source application and the destination applications; and
 applying the modeled user behaviors in combination with and one or more of the extracted data items to customize a digital assistant.

9. The computer-implemented process of claim 1 further comprising providing at least a portion of the identified and labeled extracted data items to one or more destination apps running on one or more different computing devices of the user.

10. The computer-implemented process of claim 1 further comprising providing at least a portion of the identified and labeled extracted data items to one or more destination apps running on one or more of different computing devices of different users.

11. The computer-implemented process of claim 1 further comprising providing anonymized versions of at least a portion of the identified and labeled extracted data items to one or more computing devices of other users.

12. A computer-readable storage device having computer executable instructions stored therein, said instructions causing a computing device to execute a method comprising:
 applying an application programming interface (API) to extract a plurality actions and corresponding attributes from a presentation layer of an operating system, the presentation layer causing content and user interface (UI) controls of a source app executing under the operating system to be rendered on a display device;
 applying a content model of the source app to format the extracted actions and corresponding attributes as app-independent tasks; and
 applying one or more of the app-independent tasks to populate one or more variables of one or more of destination apps that are subscribed to receive those app-independent tasks.

13. The computer-readable storage device of claim 12 further comprising a presenting a user interface for setting an authorization state for subscriptions to receive app-independent tasks.

14. The computer-readable storage device of claim 12 further comprising:
 performing an automated search to retrieve information relevant to one or more of the app-independent tasks; and
 applying an assistant app to present the retrieved information as a user selectable popup on the source application.

15. The computer-readable storage device of claim 12 further comprising automatically updating the content model when an analysis of the source app indicates that the source app has been updated.

16. The computer-readable storage device of claim 12 further comprising:
 modeling user behaviors with respect to the source app; and
 automatically initiating one or more destination apps in response to the modeled user behaviors and one or more of the app-independent tasks.

17. The computer-readable storage device of claim 12 further comprising providing at least a portion of the app-independent tasks to one or more destination apps running on one or more different computing devices of the user.

* * * * *